US007580335B2

(12) United States Patent
Fujita et al.

(10) Patent No.: US 7,580,335 B2
(45) Date of Patent: Aug. 25, 2009

(54) RECORDING APPARATUS AND METHOD, AND DISK PRODUCING METHOD

(75) Inventors: Goro Fujita, Kanagawa (JP); Naoki Ide, Tokyo (JP)

(73) Assignee: Sony Corporation, Tokyo (JP)

( * ) Notice: Subject to any disclaimer, the term of this patent is extended or adjusted under 35 U.S.C. 154(b) by 606 days.

(21) Appl. No.: 11/349,404

(22) Filed: Feb. 6, 2006

(65) Prior Publication Data

US 2006/0176798 A1  Aug. 10, 2006

(30) Foreign Application Priority Data

Feb. 9, 2005  (JP) .............................. 2005-033317

(51) Int. Cl.
*G11B 20/12* (2006.01)

(52) U.S. Cl. .................................. 369/59.25

(58) Field of Classification Search ....................... None
See application file for complete search history.

(56) References Cited

U.S. PATENT DOCUMENTS

| 4,975,897 A | * | 12/1990 | Tanahashi | ................. | 369/59.18 |
| 5,025,434 A | * | 6/1991 | Tateishi et al. | ............ | 369/44.36 |
| 6,414,913 B1 | | 7/2002 | Kobayashi et al. | | |
| 6,522,612 B2 | * | 2/2003 | Miyamoto et al. | ........ | 369/59.25 |
| 7,339,872 B2 | * | 3/2008 | Ogura | ...................... | 369/59.22 |

* cited by examiner

*Primary Examiner*—Peter Vincent Agustin
(74) *Attorney, Agent, or Firm*—K&L Gates LLP

(57) ABSTRACT

A sub data recorder to record sub data on an optical-disk recording medium is provided. In one example, a sub data recorder records sub data by forming marks on a reflective layer of an optical-disk recording medium to which main data is recorded as a combination of pits and lands by irradiating laser light having a writing power to the reflective layer, the sub data can be recorded stably. An embodiment provides a recording apparatus to record sub data to an optical-disk recording medium formed from a substrate and at least a reflective layer and cover layer stacked on the substrate and to which main data is to be recorded as a combination of pits and lands formed on the substrate by irradiating laser light having a writing power to the reflective layer to form marks as the sub data on the reflective layer, the apparatus including a read signal generator to generate a read signal by detecting a return part of laser light having a reading power, irradiated to the optical-disk recording medium, a sub data recorder to record the sub data by forming the marks in mark inserting positions on the reflective layer of the optical-disk recording medium, determined in conformity to a predetermined rule, with the laser light being controlled to have the writing power, and a waveform replacing unit to replace a waveform of the read signal generated by the read signal generator, corresponding to a section having a predetermined length and including the mark inserting position, with a replacement waveform whose level has been set.

8 Claims, 14 Drawing Sheets

| Address | Recorded main data | Sub data |
|---------|-------------------|----------|
| 0000001 | 00011···11 | 1 |
| 0000002 | 11000···00 | 0 |
| 0000003 | 00111···11 | 0 |
| ··· | ··· | ··· |

↑ Sub data

FIG.8

RECORDING APPARATUS AND METHOD, AND DISK PRODUCING METHOD

CROSS REFERENCES TO RELATED INVENTIONS

The present application claims priority to Japanese Patent Application JP 2005-033317 filed in the Japanese Patent Office on Feb. 9, 2005, the entire content of which being incorporated herein by reference.

BACKGROUND

The present application relates to an apparatus for, and a method of, recording sub data to the reflective layer of an optical-disk recording medium to which main data is recorded as a combination of pits and lands by forming corresponding marks on the reflective layer. The present invention is also directed to a method of producing such an optical-disk recording medium.

Among optical disks, the ROM (read-only memory) disk is widely used as a package medium because many replica substrates thereof can be produced inexpensively in a short time by injection molding of plastics with a single stamper. For example, CD (Compact Disk), DVD (Digital Versatile Disk), etc. are widely prevalent as ROM disks to record information such as music, video, etc.

Disks having illegally copied thereto data recorded in a ROM disk sold as a package medium, the so-called pirate disks, have been produced and have violated the copyright for the data in the ROM disk in the past.

Generally, pirate disks are produced by forming a stamper by mastering on the basis of signals read from a normal-version disk and replicating optical disks by the stamper, or by copying signals read from the normal-version disk to many recordable disks.

Various techniques have been proposed heretofore to prevent the production of such pirate disks. A well-known one of such techniques is to append unique identification information to each of disks, for example. There can be built a system in which unique identification information is appended with this technique to each disk and a disk player reads the identification information and sends it to an external server via a network. If many such pirates disks have been produced and distributed, a large amount of the same identification information will be sent to the external server and thus such a system can detect that the pirate disks have been distributed. Further, the system can also identify a pirate-disk producer or distributor by identifying a disk player having sent the identification information to the external server.

However, even the identification information unique to each disk should be recorded in such a manner as to prevent easy copying by a commercially available disk drive, so as to be useful for protection of the copyright for the main data in the disk.

In this regard, it was proposed to record the identification information by forming corresponding marks on the reflective layer of a disk (see, Japanese Patent No. 3454410). More specifically, in the disk disclosed in Japanese Patent No. 3454410, main data (content data, management information or the like) is recorded as a combination of pits and lands, while sub data (identification information) is recorded in addition to the main data to the disk by forming, on the reflective layer of the disk, marks which will give a small change in reflectance to a portion of the reflective layer which is above a predetermined one of the pits or lands.

The marks are recorded to the reflective layer by irradiating laser light higher in power than the reading laser light. The change in reflectance caused by the mark is so small that reading of the main data recorded as a combination of pits and lands will not be influenced, namely, that the sub data will not be read during normal reading of the main data.

To read the sub data itself, a separate playback system may be provided to sample many parts of the read signal of the main data, each given the small change in reflectance, and integrate the samples, for example.

In this case, a position where a mark is to be inserted as sub data is determined according to a predetermined algorithm. That is, with the normal-version disk player, it is possible to identify a position where the mark is to be recorded according to the similar algorithm to an algorithm used for recording and thus read the identification information as the sub data accurately.

Referring now to FIG. 1, there is schematically illustrated the internal structure of a sub data recorder designed based on the technique disclosed in Japanese Patent No. 3454410. The sub data recorder is generally indicated with a reference numeral 50.

As above, the sub data is identification information unique to each disk. Therefore, the sub data recorder 50 is to record sub data in a unique pattern to each of disks loaded therein.

Also, the sub data is recorded in a predetermined section on the disk, and each mark is inserted in a predetermined position in the section. The sub data recorder 50 is designed to record a mark in such a predetermined position.

First, a disk D is placed on a turntable (not shown), and a spindle motor 51 rotates the disk D by a predetermined rotation driving method. An optical pickup OP shown in FIG. 1 reads recording signal (main data) from the disc D being thus rotated.

The optical pickup OP includes a laser diode LD to emit laser light, objective lens 52 to condense and focus the laser light emitted from the laser diode LD onto the recording surface of the disk D, photodetector PD to detect a return part, from the disk D, of the laser light irradiated to the disk D, etc. as shown in FIG. 1.

The return part of the irradiated laser light or return light detected by the photodetector PD in the optical pickup OP is converted by an IV conversion circuit 53 into an electrical signal, and then supplied to a matrix circuit 54. The matrix circuit 54 generates a read signal RF, tracking error signal TE and focus error signal FE on the basis of the return light information supplied from the IV conversion circuit 53.

The sub data recorder 50 also includes a servo circuit 55 that controls a tracking drive signal TD and focus drive signal FD supplied from a biaxial drive circuit 56 on the basis of the tracking error signal TE and focus error signal FE supplied from the matrix circuit 54. The controlled tracking drive signal TD and focus drive signal FD are supplied to a biaxial mechanism (not shown) that holds the objective lens 52 inside the optical pickup OP and makes tracking servo control and focus servo control of the objective lens 52.

Also, the read signal RF generated by the matrix circuit 54 is equalized by an equalizer (EQ) 57 and then supplied to a binarization circuit 59 in which it will be converted into a binary data "0" or "1", The binary data is supplied to a PLL (Phase-Locked Loop) circuit 60, sync detection circuit 61 and address detection circuit 62.

Also, the read signal RF from the matrix circuit 54 is supplied to a center level detection circuit 58 that will detect a center level of the read signal RF. The center level is used for binarization in the binarization circuit 59.

The PLL circuit 60 generates a master clock CLK synchronous with the supplied binary data, and supplies it as an operation clock to each of appropriate system components, especially, to the equalizer 57 and binarization circuit 59 as well as to a synchronization detection circuit 61, address detection circuit 62 and sub data generator 63, which will be explained below.

The PLL circuit 60 generates a PLL error signal from a phase difference between an edge pulse resulted from slicing made of the read signal RF in the binarization circuit 59 on the basis of the center level and an output signal (master clock CLK) from an internal VCO (Voltage-Controlled Oscillator), and feeds it back to the VCO to generate the master clock CLK synchronous with the binary data as above.

The sync detection circuit 61 generates a frame sync signal on the basis of the result of detection of a sync pattern in the supplied binary data, and supplies it to each of the appropriate system components, such as the address detection circuit 62.

The address detection circuit 62 detects address information ADR on the basis of the frame sync signal and supplied binary data. The address information ADR is supplied to a controller (not shown) that controls the entire sub data recorder 50. In the controller, the address information ADR is used for seeking etc. The address information ADR is also supplied to a writing timing generation circuit 64 in the sub data generator 63.

The sub data generator 63 includes the writing timing generation circuit 64 and a RAM (Random-Access Memory) 65 as shown. The sub data generator 63 generates, based on an input sub data, address information ADR and master clock CLK, a writing timing signal Wrt intended for recording marks to be recorded as sub data in predetermined positions on the disk D.

Here will be briefly described the operations made in the sub data generator 63 for recording the sub data.

First, it is assumed here that marks as sub data are to be recorded on a predetermined-length one of pits and lands recorded in combination as main data on the disk D (see FIG. 7, for example).

To this end, the sub data generator 63 has to generate the writing timing signal Wrt that will take a high level (H level) at a time when the predetermined-length one of the pits or lands as the main data is reached. To generate such a writing timing signal Wrt, the RAM 65 in the sub data generator 63 has stored therein the content of main data to be recorded to the disk D.

The sub data is identification information unique to each disk D as also mentioned above. Such a unique identification information is supplied to the writing timing generation circuit 64 in the sub data generator 63 each time a disk D is loaded into the sub data recorder 50.

The writing timing generation circuit 64 identifies the position of a predetermined-length one of pits or lands as the main data stored in the RAM 65, and generates the writing timing signal Wrt at a time corresponding to the pit or land position. Since a mark is to be recorded actually in a bit position at the center (third bit position in case of 5 T, for example), so the writing timing signal Wrt is generated which will take the H level at a time corresponding to the central bit position.

A laser power controller 66 is also included in the sub data recorder 50 to control the laser output of the laser diode LD in the optical pickup OP on the basis of a writing timing signal Wrt supplied from the sub data generator 63. More specifically, the laser power controller 66 controls the laser diode LD to emit laser light having a reading power when the writing timing signal Wrt is at a low level (L level). Also, the laser power controller 66 controls the laser diode LD to emit laser light having a writing power when the writing timing signal Wrt is at the H level.

With irradiation of the writing-power laser light emitted from the laser diode LF under the control of the laser power controller 66, marks will be formed as sub data in laser-irradiated portions of the reflective layer of the disk D.

FIG. 2 shows waveforms indicative of recording operations made in the sub data recorder 50 constructed as shown in FIG. 1.

First, the center level is detected by the center level detection circuit 58 on the basis of the read signal RF. Based on the detected center level, there is generated an edge pulse indicating edge timing of pits and lands formed on the disk D.

As also mentioned above, the PLL circuit 60 generates a PLL error signal corresponding to a phase difference between the above edge pulse and the output pulse from the VCO, and the PLL signal is fed back to the VCO to generate a correct master clock CLK synchronous with the binary signal.

When recording marks as sub data on the disk D in the sub data recorder 50 shown in FIG. 1, the laser power controller 66 controls the laser diode LD to provide laser light having the writing power.

Thus, since the photodiode PD in the optical pickup OP will detect strong return light from the disk D in a section in which the writing timing signal Wrt takes the H level, so the read signal RF in this section will correspondingly have a waveform in which a writing pulse is superposed on the read signal RF as shown and have the value thereof increased to a very high level.

If the read signal RF has the level thereof thus abruptly elevated in the mark-recorded portion, it will not have a value which is normally obtainable and thus the edge pulse will also be erroneous.

FIG. 2 shows an example in which the mark as sub data is recorded on each predetermined-length pit or land. However, especially in case the mark is to be formed on the pit portion, there exists a high possibility that the edge pulse will be erroneous. That is, though the read signal RF on the pit portion should normally have a negative value, a writing pulse will be superposed on the read signal RF due to the mark recording as above so that the value of the read signal RF will increase to a level higher than the center level as shown being encircled (indicated with a reference symbol X) in FIG. 2. With the read signal value higher than the center level, there will be generated an edge pulse which should normally be impossible.

If the edge pulse is thus generated in incorrect timing, the PLL error signal also becomes erroneous as shown and the timing of the master clock CLK controlled based on the erroneous PLL error signal is also erroneous. The error the master clock CLK incurs will cause the system components of the sub data recorder 50 to operate incorrectly.

Among others, the writing timing signal Wrt is generated by the writing timing generation circuit 64 in timing of the master clock CLK during recording to instruct the laser power controller 66 for correct timing of recording. Thus, because of the erroneous master clock CLK, the marks as sub data cannot be recorded in correct positions.

Also, if the master clock CLK is erroneous, the address detection circuit 62 cannot detect address information ADR accurately.

Also, if the read signal RF has the value thereof abruptly increased in a portion of the disk D where the mark is to be recorded as mentioned above, the center level detected based on the read signal RF will disadvantageously be higher than a normal level (see the level indicated with a reference symbol Y in FIG. 2).

If an elevation of the center level also makes it impossible to correctly generate an edge pulse, the master clock CLK will be erroneous.

That is, the above elevation of the center level makes it impossible to record the mark in a correct inserting position as above and detect address information accurately.

Further, in the sub data recorder 50 constructed as shown in FIG. 1, the read signal RF having the writing pulse superposed thereon is equalized by the equalizer 57 shown in FIG. 1, and then the edge pulse is generated by the binarization circuit 59.

Since the read signal RF has a waveform in which it has the writing pulse superposed thereon as above, there is a high possibility that the waveform of the read signal RF after equalized does not have the normal waveform. Also in this respect, it is not possible for the binarization circuit 59 to generate an edge pulse correctly. That is, it is impossible to generate the master clock CLK correctly and detect an address accurately.

It is therefore desirable to overcome the above-mentioned drawbacks of the related art by providing an improved and novel sub data recording apparatus and method and an optical-disk recording medium producing method.

SUMMARY

According to embodiments of the present invention, there is provided a recording apparatus. That is, the recording apparatus is to record sub data to an optical-disk recording medium formed from a substrate and at least a reflective layer and cover layer stacked on the substrate and to which main data is to be recorded as a combination of pits and lands formed on the substrate by irradiating laser light having a writing power to the reflective layer to form marks as the sub data on the reflective layer, and includes a read signal generating means for generating a read signal by detecting a return part of laser light having a reading power, irradiated to the optical-disk recording medium.

The recording apparatus further includes a sub-data recording means for recording the sub data by forming the mark in each mark inserting position on the reflective layer of the optical-disk recording medium, determined in conformity with a predetermined rule, with the laser light being controlled to have the writing power.

The recording apparatus also includes a waveform replacing means for replacing a waveform of the read signal generated by the read signal generating means, corresponding to a section having a predetermined length and including the mark inserting position, with a replacement waveform whose level has been set.

According to an embodiment a recording method is provided to record sub data to an optical-disk recording medium formed from a substrate and at least a reflective layer and cover layer stacked on the substrate and to which main data is to be recorded as a combination of pits and lands formed on the substrate by irradiating laser light having a wiring power to the reflective layer to form marks as the sub data on the reflective layer, and includes a step of generating a read signal by detecting a return part of laser light having a reading power and which has been irradiated to the optical-disk recording medium.

The recording method further includes a step of recording the sub data by forming the mark in each mark inserting position on the reflective layer of the optical-disk recording medium, determined in conformity to a predetermined rule, with the laser light being controlled to have the writing power.

The recording method also includes a step of replacing a waveform of the read signal generated by the read signal generating means, corresponding to a section having a predetermined length and including the mark inserting position, with a waveform whose level has been set.

According an embodiment a disk producing method is provided to produce an optical-disk recording medium formed from a substrate and at least a reflective layer and cover layer stacked on the substrate and to which main data is to be recorded as a combination of pits and lands formed on the substrate by irradiating laser light having a writing power to the reflective layer to form marks as the sub data on the reflective layer, the method including a step of forming a disk master having the main data recorded as the combination of pits and lands thereon.

Also, the method includes a step of producing a disk having only the main data recorded thereon forming the substrate using a stamper formed based on the disk master and stacking at least the reflective layer and cover layer on the substrate.

Further, the method includes a step of recording the sub data to the disk having the main data recorded thereon.

The sub-data recording step includes a sub step of generating a read signal by detecting a return part of laser light having a reading power and which has been irradiated to the disk having the main data recorded thereon.

The sub-data recording step further includes a sub step of recording the sub data by forming the mark in each mark inserting position on the reflective layer of the disk having the main data recorded thereon, determined in conformity to a predetermined rule, with the laser light being controlled to have the writing power.

The sub-data recording step also includes a sub step of replacing a waveform of the read signal generated in the read signal generating step, corresponding to a section having a predetermined length and including the mark inserting position, with a waveform whose level has been set.

According to an embodiment, because the waveform of a read signal portion on which a writing pulse is superposed for recording marks is replaced with a replacement waveform whose level has been set, the level of the read signal RF can be prevented from being elevated due to the superposition of the writing pulse on the read signal.

Thus, an edge pulse of the read signal can be correctly generated, and a correct master clock can also be generated on the basis of the edge pulse.

Also, since the read signal level can be prevented from being elevated, the center level of the read signal can also be prevented from being elevated, so that a correct master clock CLK can be generated.

Also, the equalization of the read signal is not influenced by the superposition of the writing pulse on the read signal, which also ensures that a correct master clock CLK can be generated.

Thus, according to an embodiment, the waveform of a read signal portion on which a writing pulse is superposed for recording marks is replaced with a replacement waveform whose level has been set, such that it is possible to generate a correct master clock. Thus, with generation of the correct master clock, a mark can be recorded as sub data in each correct mark inserting position. Further, with generation of the correct master clock, address information can also be detected accurately.

Also, the disk producing method according to an embodiment, capable of recording the marks as sub data on the basis of the correct master clock, permits production of an optical-disk recording medium having the mark formed in each correct inserting position.

Additional features and advantages are described herein, and will be apparent from, the following Detailed Description and the figures.

BRIEF DESCRIPTION OF THE FIGURES

FIG. 8 shows the structure of a data content to be stored to generate a timing signal with which sub data is recorded in the recorder of the first embodiment;

DETAILED DESCRIPTION

Embodiments of the present invention will be described in detail below with reference to the accompanying drawings.

Figure 3:
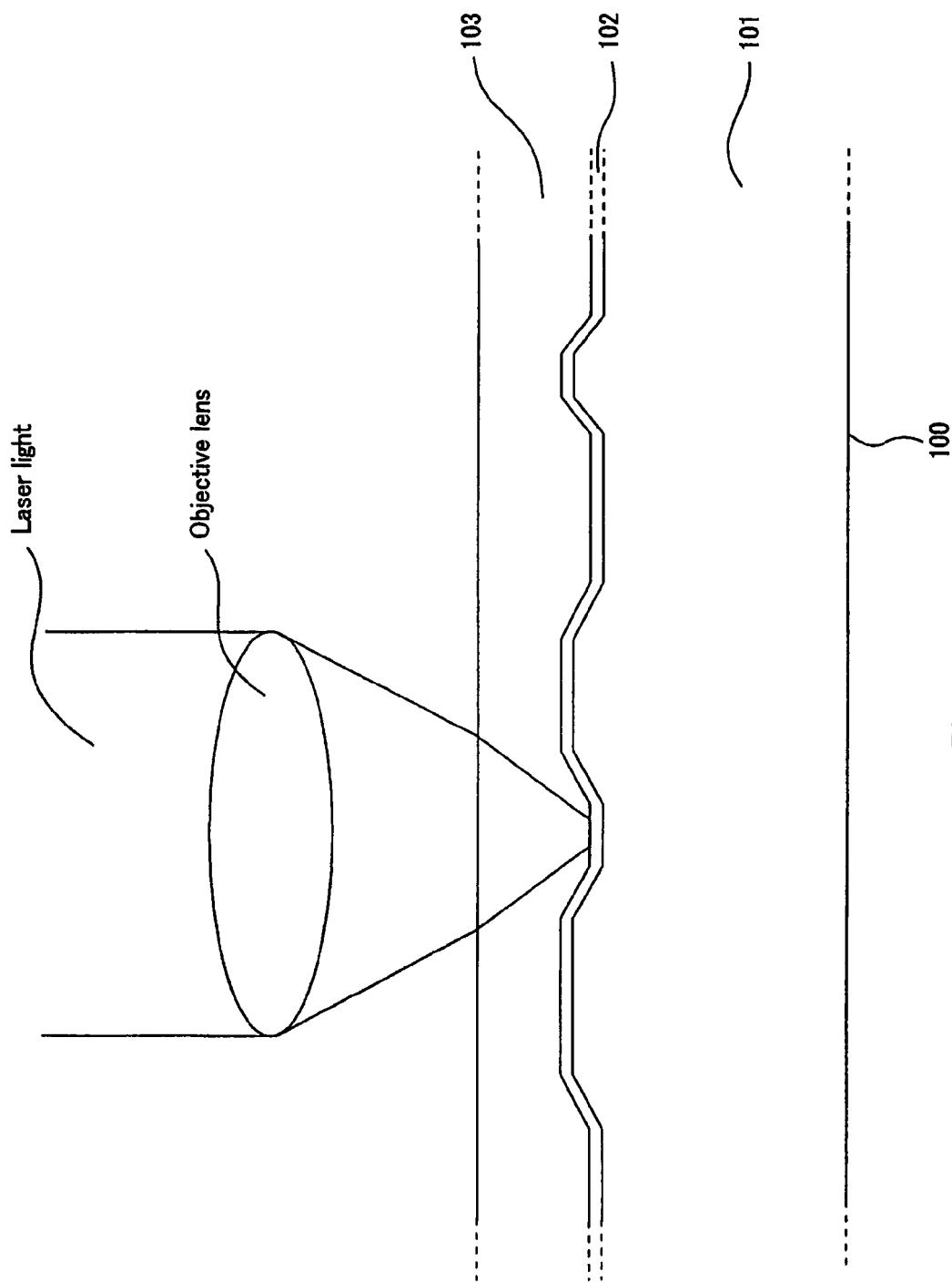
FIG. 3 is a sectional view of an optical-disk recording medium compatible with the recording apparatus as an embodiment.

Referring now to FIG. 3, there is schematically illustrated in the form of a sectional view a disk as the optical-disk recording medium according to an embodiment. The disk is generally indicated with a reference numeral 100.

The disk 100 according to the present invention is of a ROM (Read-Only Memory) type. More particularly, it adopts a disk structure and format complying with the so-called Blue-Ray™ Disk.

As shown, the disk 100 includes a substrate 101, reflective layer 102 stacked on the substrate 101 and cover layer 103 stacked on the reflective layer 102. The substrate 101 is formed from plastics such as polycarbonate. The surface of the substrate 101, in contact with the reflective layer 102, is formed to have a concavo-convex section. The concavity is a pit and the convexity is a land. The disk 100 is capable of recording information as pits and lands in combination, more specifically, as a pit length and land length.

The reflective layer 102 is stacked on the substrate 101 having the pits and lands formed thereon. Then, the cover layer 103 made of polycarbonate or the like is stacked on the reflective layer 102.

When the reflective layer 102 is stacked on the substrate 101, it will have a concavo-convex section corresponding to the shapes of the pits and lands. Also, the reflective layer 102 is formed from a film of aluminum or the like, for example, to provide return light corresponding to the concavity and convexity when laser light is focused by an objective lens on the reflective layer 102 through the cover layer 103 as shown. A sub data recorder 1 or 20, which will be described in detail later, can detect information recorded as a combination of pits and lands on the basis of a return part, from the reflective layer 102, of the laser light irradiated to the disk 100.

Figure 4:
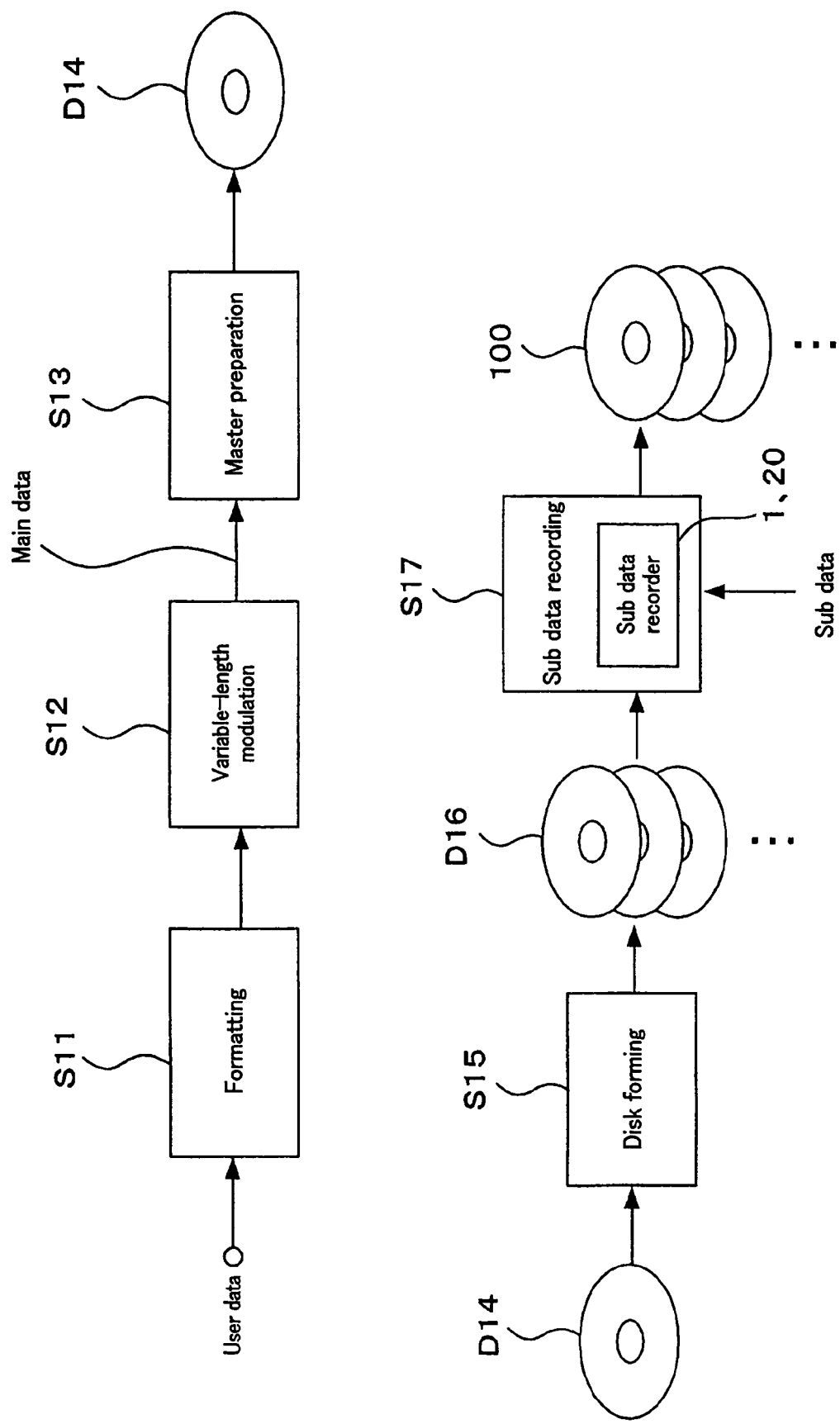
FIG. 4 explains the process of producing the optical-disk recording medium.

FIG. 4 explains the process of producing the disk 100.

To produce the disk 100, formatting is first done in step S11 as shown using a computer or the like.

In step S11, a content (user data) to be recorded to the disk 100 is converted into a format data row conforming to a predetermined standard. According to the present invention, the conversion is made to provide a data row conforming to the standard for the Blue-Ray™ Disk as will be explained later with reference to FIG. 5. Actually, an error detection code, error correction code and parity code are appended to the user data, and the user data is subjected to interleaving and other processing.

Variable-length modulation is made in step S12. The data row resulted from the formatting in step S11 is subjected to a variable-length modulation. According to the present invention, the data row is subjected to RLL (1, 7) PP (Parity Preserve/Prohibit, RLL: Run Length Limited) modulation and NRZI (Non-Return to Zero Inverse) modulation. A pattern of "0" and "1" of the data row, resulted from the variable-length modulation in step S12, becomes a pattern of pits and lands actually formed on the disk 100.

The data resulted from the formatting and variable-length modulation of the user data will be referred to as "main data" herein.

Next in step S13, a master is prepared using a mastering apparatus.

In step S13, photoresist is first applied to a glass substrate. Then, laser light corresponding to the main data resulted from the variable-length modulation in step S12 is irradiated to the glass substrate having the photoresist applied thereon as above while the latter is being rotated, to form a concavo-convex pattern along a recording track. That is, pits and lands are formed.

Next, the photoresist having the pits and lands formed therein is developed for fixation to the glass substrate, and electrolytic plating is made on the surface of the glass substrate to form a metallic master D14 as shown.

The metallic master D14 thus formed is used to form a disk in step S15.

In step S15, a stamper is first formed based on the metallic master D14. Then, an injection molding machine is used to form the substrate 101 from a transparent resin such as polycarbonate, acrylic or the like with the stamper being placed in a mold. On the substrate 101, there will be formed pits and lands corresponding to the main data resulted from the variable-length modulation in step S12 along a recording track.

Then, the reflective layer 102 is first stacked, by deposition, on the substrate 101, and the cover layer 103 is stacked on the reflective layer 102. Thus, there is first formed a disk having only the main data recorded thereon (main data-recorded disk) D16.

Next, sub data is recorded in step S17.

According to an embodiment, sub data is recorded in addition to the main data recorded as the pit-and-land pattern as above.

In this case, serial number information unique to each disk D16 (100) is to be recorded as sub data. That is, in step S17, unique identification information (serial number) will be appended to each disk 100 formed as above.

As will be described in detail later, the sub data is recorded as a mark formed, by laser irradiation to the reflective layer 102, in a specific position in a specific section of the main data recorded as the pit-and-land pattern.

In step S17, the sub data recording is made by the sub data recorder 1 or 20 which will be described in detail later.

Figure 5:
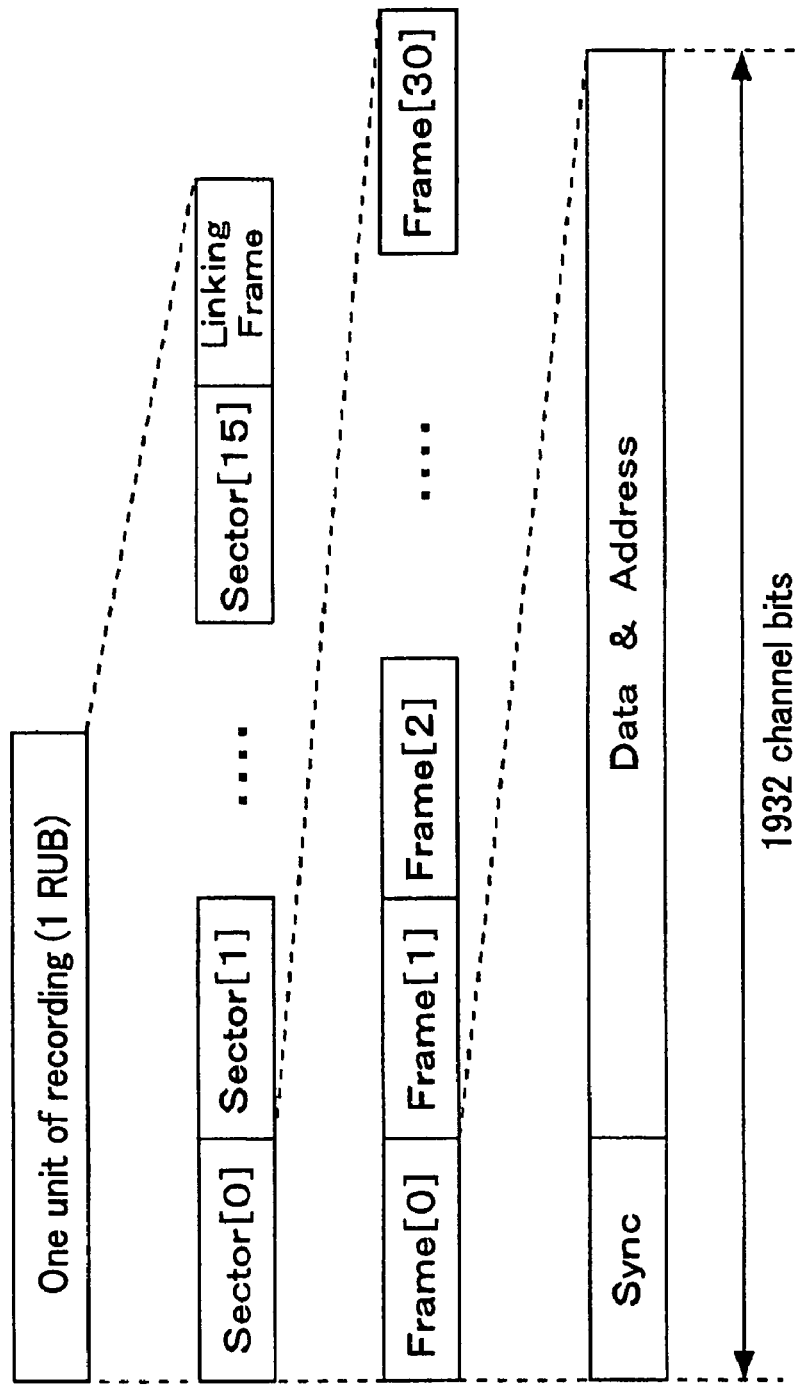
FIG. 5 explains the data structure of main data to be recorded to the optical-disk recording medium.

FIG. 5 illustrates the data structure of the main data recorded to the disk 100 produced in the aforementioned process.

First, one unit of recording called "RUB" is defined as shown. One RUB includes 16 sectors and 2 linking frames. Each linking frame is provided as a buffer area between RUBs.

In this case, one sector forms one address unit.

Each of the sectors consists of 31 frames as shown. One frame is formed from data of 1932 channel bits.

In the Blue-Ray™ Disk referred to as an example herein, since the main data conforms to the RLL (1, 7) PP modulation rule, so the numbers of codes "0" and "1" in succession (that is, a pit length and land length) are limited in length each to 2 T (channel bits) to 8 T.

A succession of codes of 9 T not conforming to the modulation rule is inserted in "Sync" at the top of each frame and used for detection of a frame sync signal at the time of placing back the disk.

FIRST EMBODIMENT

To record the sub data to the disk shown in FIG. 4 (namely, the main data-recorded disk D16), the present invention proposes a sub data recorder 1 as a first embodiment thereof and another sub data recorder 20 as a second embodiment.

First, the sub data recorder 1 as the first embodiment will be explained with reference to the schematic block diagram shown in FIG. 6.

As having been described above, the sub data referred to herein is identification information unique to each disk D16. Therefore, the sub data recorder 1 operates to record, as sub data, a value different from one disk D16 loaded in the recorder 1 to another.

Also, the sub data is to be recorded in a predetermined area on the disk D16 and further a mark as the sub data is to be inserted in each predetermined position in the predetermined area. The sub data recorder 1 is designed to record the mark in the predetermined position as above.

Figure 6:
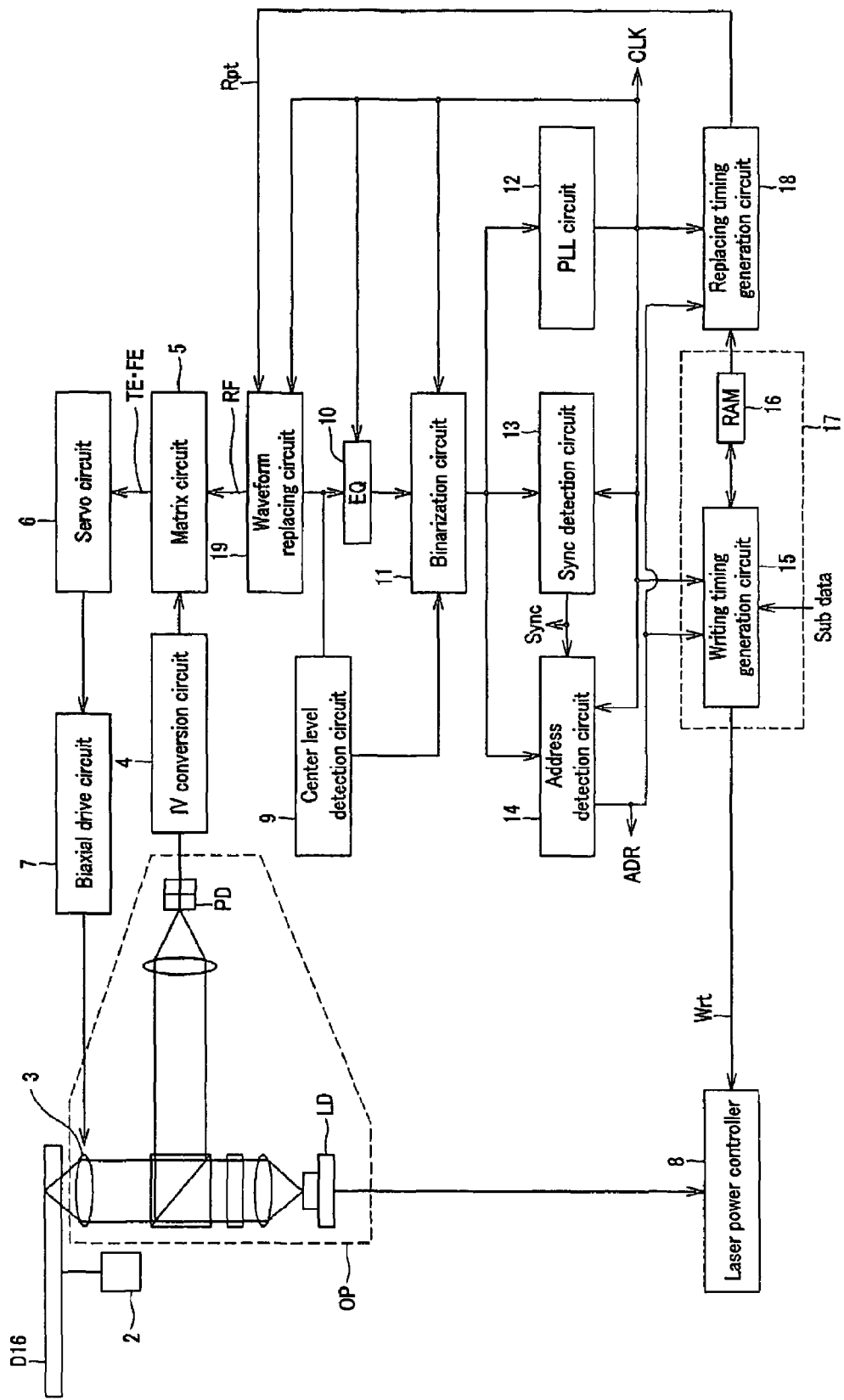
FIG. 6 is a schematic block diagram of a recorder of a first embodiment.

As shown in FIG. 6, the disk D16 being placed on a turntable (not shown) is rotated by a spindle motor 2 by a predetermined rotation driving method. An optical pickup OP shown in FIG. 6 reads a recording signal from the disk D16 being thus rotated.

As shown, the optical pickup OP includes a laser diode LD as a laser source, objective lens 3 to condense and focus laser light emitted from the laser diode LD on the recording surface of the disk D16, photodetector PD to detect a return part of the irradiated laser light from the disk D16, etc.

The return-light information detected by the photodetector PD in the optical pickup OP is converted by an IV conversion circuit 4 into an electrical signal, and the electrical signal is supplied to a matrix circuit 5. The matrix circuit 5 generates a read signal RF, tracking error signal TE and focus error signal FE on the basis of the return-light information supplied from the IV conversion circuit 4.

The sub data recorder 1 also includes a servo circuit 6 as shown. The servo circuit 6 controls a tracking drive signal TD and focus drive signal FD supplied from a biaxial drive circuit 7 also included in the sub data recorder 1 on the basis of the tracking error signal TE and focus error signal FE supplied from the matrix circuit 5. The tracking drive signal TD and focus drive signal FD are supplied to a biaxial mechanism (not shown) supporting the objective lens 3 inside the optical pickup OP, and the objective lens 3 is driven in the tracking and focusing directions on the basis of these signals TD and FD.

In the tracking and focusing servo system consisting of these servo circuit 6, biaxial drive circuit 7 and biaxial mechanism, the servo circuit 6 provides, based on the tracking error signal TE and focus error signal FE, such a control that a beam spot of the laser light irradiated to the disk D16 will be defined on the disk D16, trace a train of pits (recording track) formed on the disk D16 and be kept accurately focused.

In this embodiment, the read signal RF generated by the matrix circuit 5 is supplied to an equalizer (EQ) 10 and center level detection circuit 9 via a waveform replacing circuit 19 also shown in FIG. 6.

The sub data recorder 1 further includes a binarization circuit 11. The binarization circuit 11 is supplied with the read signal RF whose waveform has been equalized by the equalizer 10. It is also supplied with a center level of the read signal RF detected by the center level detection circuit 9. For example, in case the main data for recording to the disk D16 is encoded with a DC free code, the center level can be determined by calculating a mean value of the read signal RF.

Note that the waveform replacing circuit 19 included in this embodiment as above will be described in detail later.

The binarization circuit 11 generates an edge pulse indicative of an edge of pits and lands formed on the disk D16 by slicing the read signal RF on the basis of the center level supplied as above, and converts the read signal RF into binary data "0" or "1" on the basis of the edge pulse.

The binary data is supplied to a PLL (Phase-Locked Loop) circuit 12, sync detection circuit 13 and address detection circuit 14.

The PLL circuit 12 generates a master clock CLK synchronous with the supplied binary data, and supplies it as an operation clock to each of the appropriate system components. In this case, the PLL circuit 12 generates the master clock CLK synchronous with the binary data by generating a PLL error signal from a phase difference between the edge pulse generated by the binarization circuit 11 and output signal (master clock CLK) from an internal VCO (Voltage-Controlled Oscillator) and feeding it back to the VCO.

In this case, the master clock CLK generated by the PLL circuit 12 is supplied as an operation clock to each of the above equalizer 10 and binarization circuit 11, and to the sync detection circuit 13 and address detection circuit 14, which will be explained below, and to a sub data generator 17.

Also, in this embodiment, the master clock CLK is also supplied to a replacing timing generation circuit 18. It should be noted that the replacing timing generation circuit 18 will be described in detail later.

The sync detection circuit 13 detects a sync pattern in the supplied binary data and generates a frame sync signal on the basis of the result of detection. The frame sync signal is supplied to the address detection circuit 14 and to each of other appropriate system components.

The address detection circuit 14 detects address information ADR on the basis of the frame sync signal and supplied binary data. The address information ADR is supplied to a controller (not shown) that controls the entire sub data recorder 1. In the controller, it will be used for seeking or the like. Also, the address information ADR is supplied to a writing timing generation circuit 15 included in the sub data generator 17. In this embodiment, it will also be supplied to the replacing timing generation circuit 18.

As shown, the sub data generator 17 includes the writing timing generation circuit 15 and a RAM (Random-Access Memory) 16. The sub data generator 17 generates a writing timing signal Wrt for recording marks as sub data to be recorded to the disk D16 in predetermined positions on the disk D16 on the basis of the sub data, address information ADR and master clock CLK.

Note that the sub-data recording operation based on the operation of the sub data generator 17 will be explained in detail later.

The sub data recorder I further includes a laser power controller 8. This laser power controller 8 controls the laser power of the laser diode LD in the optical pickup OP on the basis of the writing timing signal Wrt supplied from the sub data generator 17. More specifically, the laser power controller 8 controls the laser power to provide a laser output having a reading power when the writing timing signal Wrt is at the L level. Also, it controls the laser power to provide a writing-power laser output when the writing timing signal Wrt is at the H level.

With irradiation of the writing-power laser light under the control of the laser power controller 8, marks will be formed as sub data in laser-irradiated spots on the reflective layer 102 of the disk D16.

Figure 7:
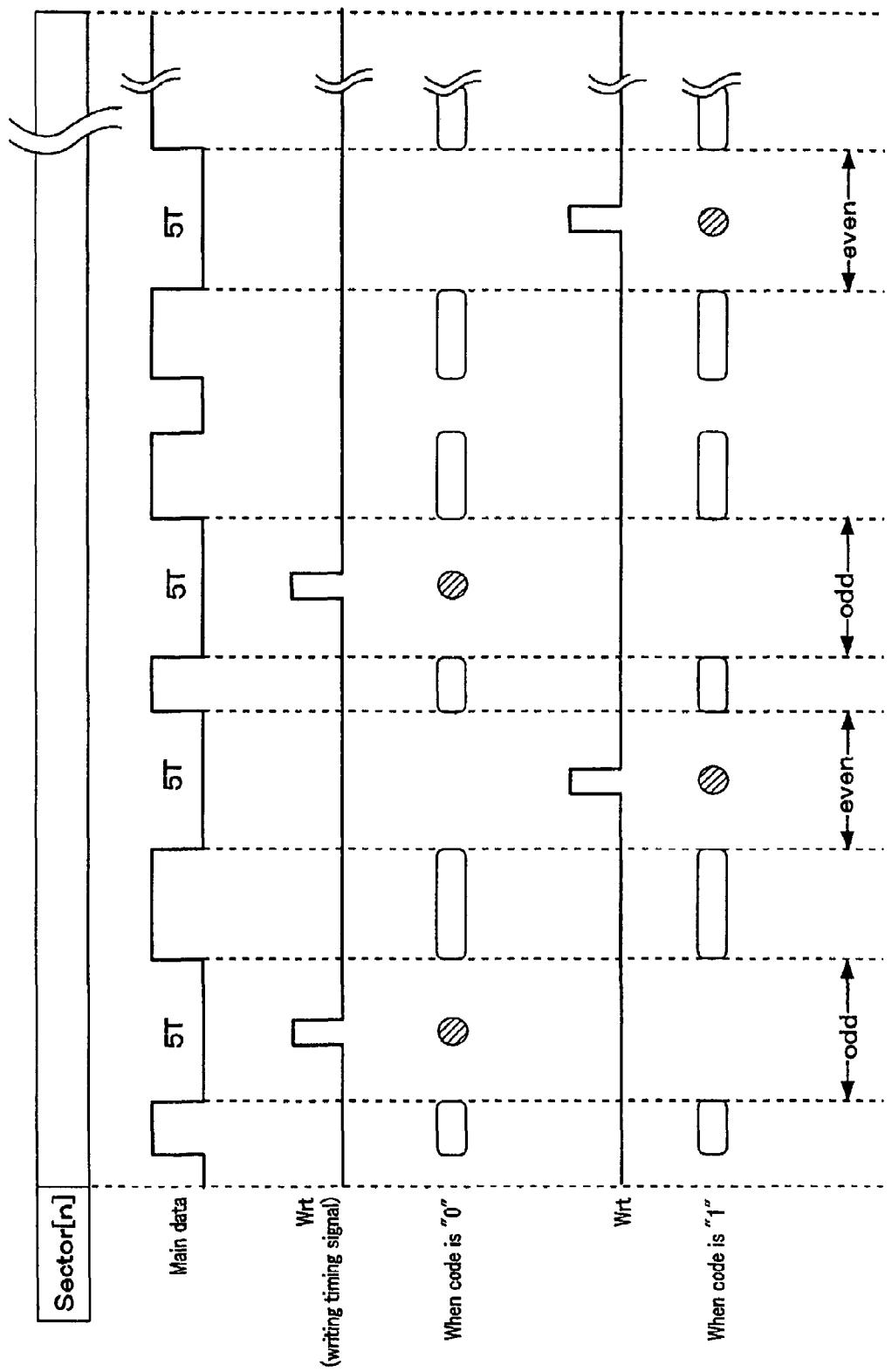
FIG. 7 explains the manner of sub-data recording.

FIG. 7 explains how sub data is recorded by the aforementioned sub data generator 17.

In FIG. 7, there are shown an example in which "0" is recorded as a code for each bit of sub data and an example in which "1" is recorded as a code for such a bit.

First, the code is represented by a set of an odd pit or land, and an adjacent even one, each of which has a predetermined length, of the pits and lands formed as the main data. For each set of such odd and even predetermined-length pits or lands, the code is defined as "0" when the mark is recorded on the odd pit or land, while the code is defined as "1" when the mark is recorded on the even pit or land.

In the examples shown in FIG. 7, the mark is recorded on a predetermined-length land. More specifically, the mark is recorded on a land of 5 T. It should be noted however that the mark may of course be formed on a predetermined-length pit.

In this case, one sector which is one address unit is assigned as a section to be assigned for recording a code of one bit included in the sub data.

That is, the mark is recorded on each set of odd and even lands adjacent to each other in one sector to represent the same code as shown.

More specifically, in case a code "0" is to be recorded, the mark is recorded only on the odd predetermined-length land in one sector as shown.

Also, in case a code "1" is to be recorded, the mark is recorded only on the even predetermined-length land in one sector.

Note that to read the sub data thus recorded, the read signal RF is sampled at every set of the adjacent odd and even predetermined-length lands in one sector and the value of the read signal RF sampled at the even land is subtracted from the value of the read signal RF sampled at the odd land ("odd–even" subtraction).

In this case, since the reflectance is decreased a little where the mark is recorded, the value of the read signal RF will ideally be decreased where the mark is recorded.

Therefore, in case the code "0" for the mark is recorded only on the odd land, the "odd–even" subtraction made at each adjacent predetermined-length land will ideally result in a negative value. Actually, however, the decrease in value of the read signal RF at the adjacent predetermined-length lands due to the mark recording is as small as will possibly be confused with noise. On this account, the result of the "odd–even" subtraction thus made is integrated for higher assurance of providing the negative value, and the negative value is detected.

On the contrary, in case the code "1" for the mark is recorded only on the even land, the "odd–even" subtraction made at each adjacent predetermined-length land will ideally result in a positive value. Also in this case, with the influence of the noise being taken in consideration, the calculated value is integrated for higher assurance of providing the positive value, and the positive value is detected.

Note here that since the same pattern of recording is repeated over the specific section as above and one value is judged based on a plurality of such same recording patterns at the time of reading the sub data, so it suffices that the change in reflectance of the reflective layer due to the mark recording is small. Because of the small change in reflectance due to the mark recording, the binarization of the main data can be prevented from being influenced by the recorded marks. In other words, with only an operation to read the main data, it is impossible to read the sub data.

Also for other codes included in the sub data, marks are recorded in the similar manner to the above-mentioned one.

That is, the sub data will be recorded over as many sectors as the codes included in the sub data.

For recording the other codes in the sub data, a section where all the codes of the sub data are to be recorded (will be referred to as "sub-data recording section" hereunder) is determined in advance between the sub data recorder 1 and a player. Therefore, the sub data recorder 1 is designed to record the aforementioned marks over a plurality of sectors as the sub-data recording section thus predetermined.

Concerning the aforementioned recording technique, it should be reminded here that if a mark to be recorded on a predetermined-length land is recorded on an edge, the main data will not possibly be binarized accurately. That is, if the mark is recorded on the edge portion of the predetermined-length land, the mark-recorded portion will correspondingly be decreased in reflectance so that a wrong land length will possibly be detected during binarization.

On this account, the mark is to be recorded at the center of the land on which the mark is to be recorded. Thus, since the edge portion can normally be obtained, so the binarization will not be influenced in this respect as well.

For the aforementioned recording operation, the writing timing generation circuit 15 in the sub data generator 17 shown in FIG. 6 is designed to generate a writing timing signal Wrt at a time as shown in FIG. 7.

That is, for the code "1", the writing timing generation circuit 17 generates a writing timing signal Wrt that takes the H level only at the center of the odd predetermined-length land. Also, for the code "0", the writing timing generation circuit 17 generates a writing timing signal Wrt that takes the H level only at the center of the even predetermined-length land.

The system construction and operations for implementing the aforementioned technique of recording will be described below with reference to FIGS. 8 and 9.

First, the sub data is recorded in a predetermined sub-data recording section on the disk D16. In the predetermined sub-data recording section, marks are recorded only on the odd or even predetermined-length lands in each sector as above.

At this time, to generate a timing signal according to which a predetermined-length land in the main data is reached in each sector as above, it is naturally necessary to know the content of main data in each sector in such a sub-data recording section.

In the sub data generator 17 shown in FIG. 6, the content of main data in each sector in the sub-data recording section is pre-stored in the RAM 16.

FIG. 8 shows the data structure in the RAM 16.

First, the address shown indicates address information on each sector in the sub-data recording section. The content of main data recorded in each sector is stored at each address.

It should be reminded that the sub data recorder 1 is to be managed by the maker of the disk D16 (disk 100). Therefore, it is possible to know in advance that the content of main data to be recorded to the disk D16 which is a ROM disk. Thus, the content of main data to actually be recorded to the disk D16 can be pre-stored at a corresponding address into the RAM 16.

Further, each value of sub data to be recorded (assigned) by the writing timing generation circuit 15 to an corresponding address in the RAM 16. The writing timing generation circuit 15 stores each value of sub data supplied from outside into the RAM 16 starting at the top address of the sub-data recording section.

Thus, the writing timing generation circuit 15 can identify predetermined-length lands in the main data according to the content of data to be stored into the RAM 16, and also the odd and even ones of the predetermined-length lands.

In addition, referring to the value of sub data stored at a corresponding address as above, the writing timing generation circuit 15 can identify on which of the predetermined-length lands thus identified a mark should be inserted, the odd or even one.

More specifically, in case the value stored in association with an address is "0", a mark is to be inserted on the odd predetermined-length land in a sector including that address as show in FIG. 7. On the other hand, if the value is "1", the mark is to be inserted on the even predetermined-length land.

Further, in this case, the mark is to be inserted at the center of the land on which the sub data is to be recorded as above. Therefore, the sub-data recording land is identified, and then a writing timing signal Wrt is generated which will take the H level at a time when the mark is recorded at the center of that land.

More specifically, such a writing timing signal Wrt is first generated by preparing "ALL 0" data including all channel bits in one sector. Then, a data row in which the code "1" has been inserted at a time (bit position) identified as above should be generated for the "ALL 0" data. Namely, there is generated a data row for one sector, in which the code "1" is in only a bit position in which the mark is to be inserted while the code "0" is in each of all other bit positions.

Based on such a data row, the writing timing generation circuit 15 can supply the laser power controller 8 with a writing timing signal Wrt that will take the H level only at a time when an appropriate mark recording position as shown in FIG. 7 is reached.

Sub data is recorded by the sub data recorder 1 as will be described in detail below with reference to the flow diagram shown in FIG. 9.

First in step S101, the disk D16 is loaded into the sub data recorder 1. Also, sub data is supplied to the sub data recorder 1 in step S102. The sub data supplied to the sub data recorder 1 is supplied to the sub data generator 17 as shown in FIG. 6.

As having been described above, the sub data thus supplied to the sub data recorder 1 is identification information unique to each disk D16.

Note that although it was described above that the sub data is supplied to the sub data recorder 1 after the disk D16 is loaded into the latter, the sub data may be supplied to the sub data recorder before the disk D16 is loaded into the latter.

In step S103, each value of the sub data is stored at a corresponding address.

That is, the operation made in step S103 is equivalent to the aforementioned operation of the writing timing generation circuit 15 in the sub data generator 17 to store each value of the supplied sub data at a corresponding address in the RAM 16 constructed as shown in FIG. 8.

In step S104, an address value N is initialized to a value N0.

More specifically, in step S104, the writing timing generation circuit 15 initializes an internal counter to the value N0 in order to generate a data row at each address as will be described below.

In step S105, the value of sub data to be recorded at the address having the value N is discriminated. More particularly, in step S105, the writing timing generation circuit 15 discriminates between ones "0" and "1", associated with corresponding addresses based on the counts in the above counter, of the sub data values stored at corresponding addresses in the RAM 16.

In case the sub data value is determined to be "1", the writing timing generation circuit 15 generates a data row in which "1" is inserted at the center of the even one of predetermined-length lands in the main data at the address having the address N (in step S106).

That is, as a data row including all channel bits in one sector, there is thus generated a data row in which only the code corresponding to the center of the even predetermined-length land is "1" while other codes are all "0".

On the other hand, in case the sub data value is determined to be "0", the writing timing generation circuit 15 generates a data row in which a data row in which "1" is inserted at the center of the odd one of predetermined-length lands in the main data at the address having the value N (in step S107). That is, as a data row including all channel bits in one sector, there is thus generated a data row in which only the code corresponding to the center of the odd predetermined-length land is "1" while other codes are all "0".

As seen from the foregoing explanation, the writing timing generation circuit 15 can generate such a data row by identifying an even or odd predetermined-length land and a bit position which is the center of the land on the basis of the content of the main data stored in each corresponding address in the RAM 16.

After generating the data row including all channel bits in one sector, the writing timing generation circuit 15 judges in step S108 whether generation of data rows for all addresses is complete. That is, the writing timing generation circuit 15 judges whether generation of the data rows is complete for all the addresses (sectors) in the sub-data recording section. The operation in step S108 is effected depending upon the result of judgment, made by the writing timing generation circuit 15, of whether the internal counter having been initialized to the value N0 in step S104 has reached a preset predetermined count.

If the result of judgment is negative, namely, if the internal counter has not yet reached the predetermined count, the address value N is incremented by one (in step S109) and then the writing timing generation circuit 15 returns to step S105. Thus, the writing timing generation circuit 15 generates the data row for all the sectors in the sub-data recording section.

In case the result of judgment in step S108 is affirmative, that is, if the internal counter has reached the predetermined count and generation of data rows for all the addresses is complete, the sub data starts being recorded in step S110.

In response to the start of sub data recording, the writing timing generation circuit 15 first seeks the top address in the sub-data recording section in the disk D16 (in step S111). For example, the seeking in step S111 can be made by controlling appropriate system components on the basis of information at the top address in a predetermined sub-data recording section by means of a controller for controlling the entire sub data recorder 1.

In response to the seeking for the top address in the sub-data recording section, the writing timing generation circuit 15 generates a writing timing signal Wrt based on the data row generated for each sector as in steps S106 and S107, and supplies it to the laser power controller 8 (in step S112). The writing timing signal Wrt based on the data row is generated based on the timing of the clock CLK for synchronization with the main data to be read.

Also, the writing timing signal Wrt starts being supplied in response to supply of information at the top address in the recording section as address information ADR which is to be supplied from the address detection circuit 14.

The writing timing signal Wrt generated by the writing timing generation circuit 15 on the basis of the data row will take the H level at a correct time as shown in FIG. 7. Therefore, with the laser power controller 8 switching the output of the laser diode LD from the reading power to writing power on the basis of the writing timing signal Wrt, marks can be recorded in specific positions on the disk D16.

Note that although it was described above that the sub data is supplied from outside, it should be appreciated that a circuit to generate a serial number for each disk D16 loaded into the sub data recorder 1 may be provided and the output from this circuit be stored in the RAM 16.

Also, sub data can be recorded to disks D16 having the same title and having main data equal in content to each other recorded therein while the main data to be stored in the RAM 16 is left unchanged in content, which has not been explained above. For recording sub data to disks D16 having different titles, however, it suffices to update the content of the main data to be stored into the RAM 16 correspondingly to the content of main data to be recorded into the disk D16.

As mentioned above, the sub data recorder 1 constructed as shown in FIG. 6 can record marks in mark inserting positions determined according to a predetermined rule, to thereby record the value of the input sub data to the disk D16. That is, the disk 100 can be produced having recorded therein identification information unique to each disk D16.

As seen from the aforementioned description, the sub data recorder 1 records sub data by controlling the laser power to the writing power at a time when the mark inserting position is reached while main data is being read from the disk D16.

Figure 1:
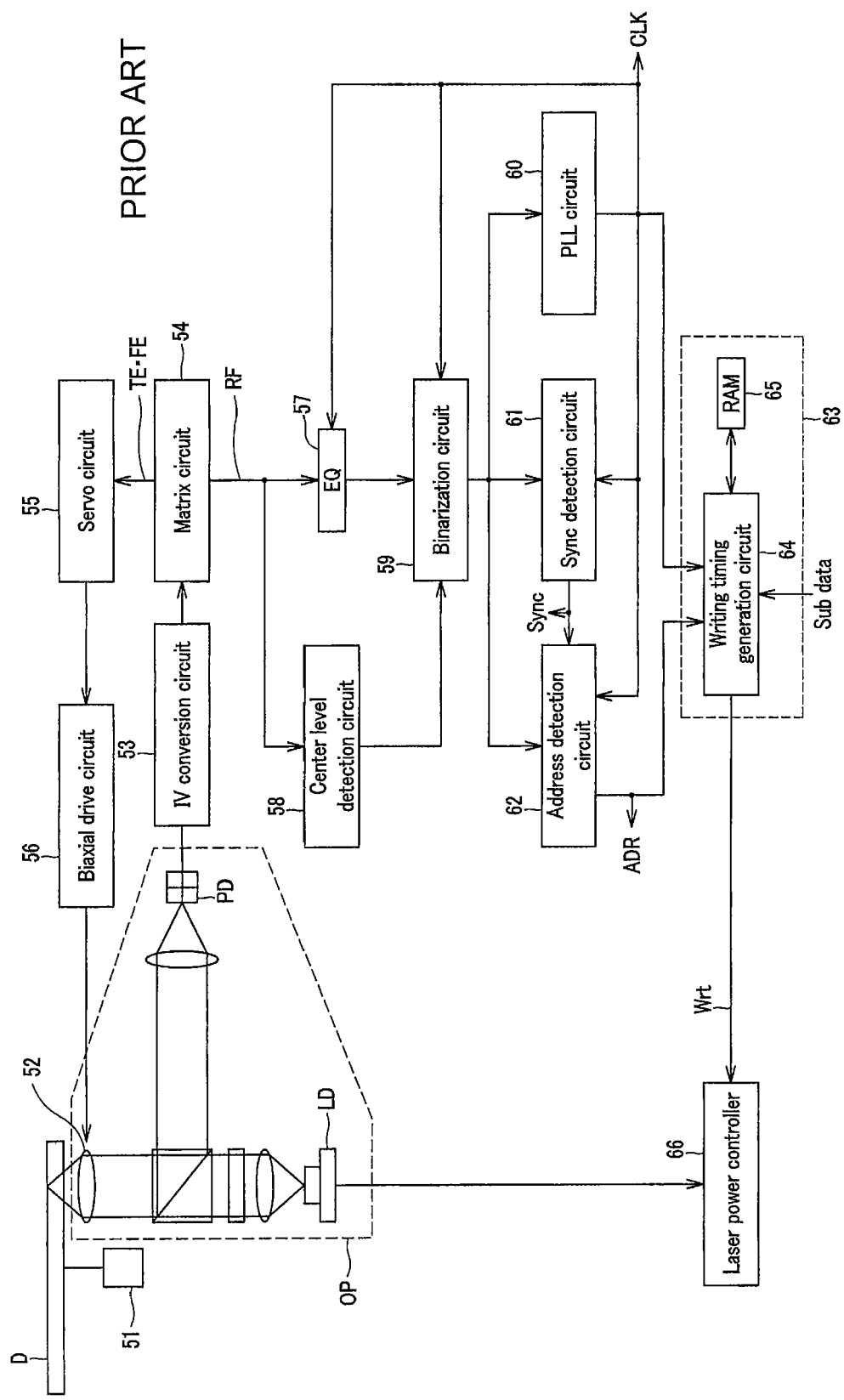
FIG. 1 is a schematic block diagram of a conventional recording apparatus.
Figure 2:
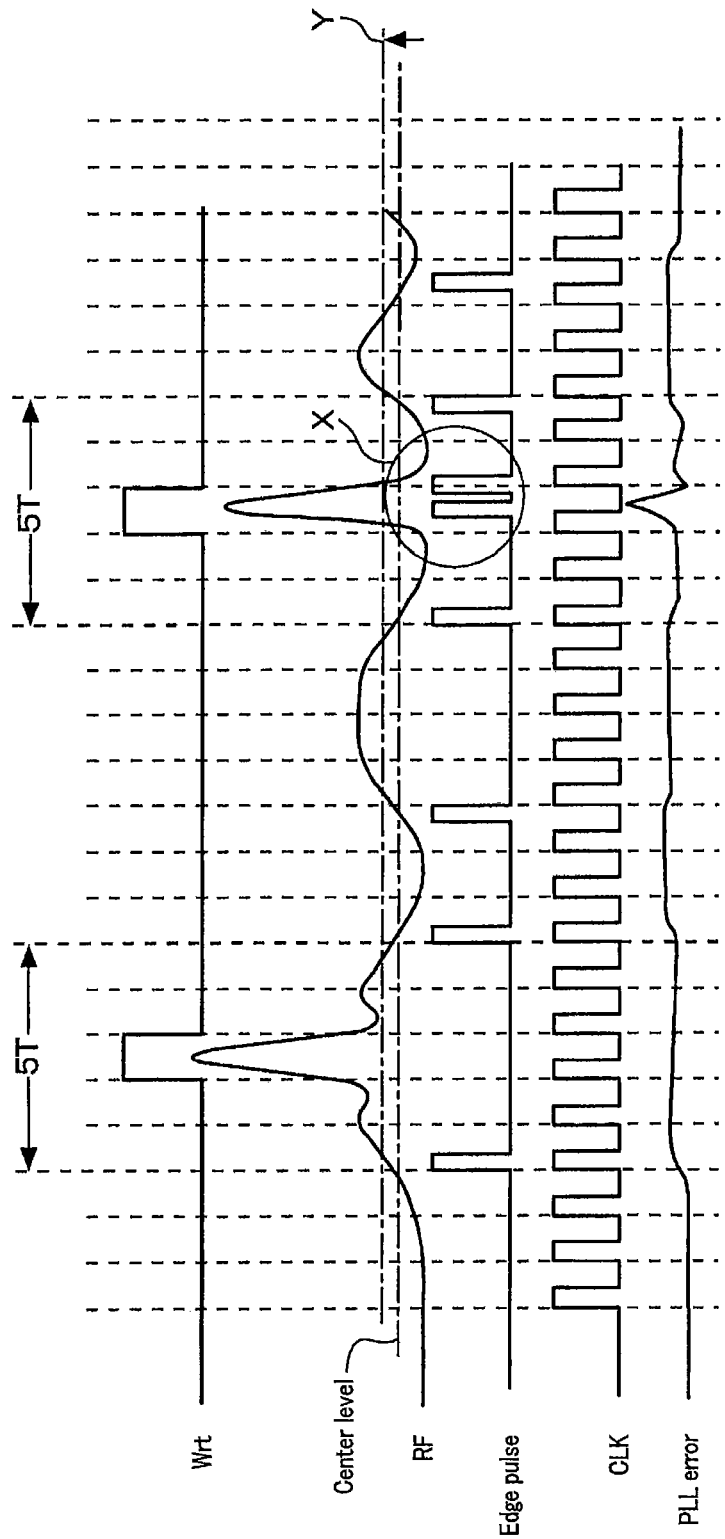
FIG. 2 shows waveforms indicative of operations made in the conventional recording apparatus to record sub data to the optical-disk recording medium.

When the writing-power laser light is irradiated to the disk D16 during reading of main data as above, the photodetector PD will detect a strong return part of the irradiated writing-power laser light, possibly resulting in superposition of a pulse, which should not normally be, on the read signal RF in the mark-recorded position as shown in FIG. 2 as well.

The superposition of the pulse, which should not normally be, on the read signal RF in the mark-recorded position will possibly result in generation of an erroneous edge pulse by the binarization circuit 11 as shown in FIG. 2 as well. As having also been described above, since the edge pulse is used for generation of the master clock CLK in the PLL circuit 12, so the erroneous edge pulse will result in inaccurate timing of the master clock CLK.

Also, the superposition of a pulse incident to the writing power on the read signal RF in the mark-recorded position as above will lead to elevation of the level of the read signal RF at the pulse-superposed portion and thus the center level detected by the center level detection circuit 9 will be higher than should normally be. Since the edge pulse is generated by the binarization circuit 11 on the basis of the center level, the elevation of the center level will result in the erroneous edge pulse. Also in this respect, the PLL circuit 12 will possibly be caused to generate an erroneous master clock CLK.

Further, the superposition of the pulse, which should not normally be, on the read signal RF will possibly cause the read signal RF resulted from the waveform equalization made in the equalizer 10 not to have a waveform which should normally be, which will also possibly cause the binarization circuit 11 to generate an erroneous edge pulse. That is, the erroneous edge pulse will also possibly cause the master clock CLK to be erroneous.

Figure 9:
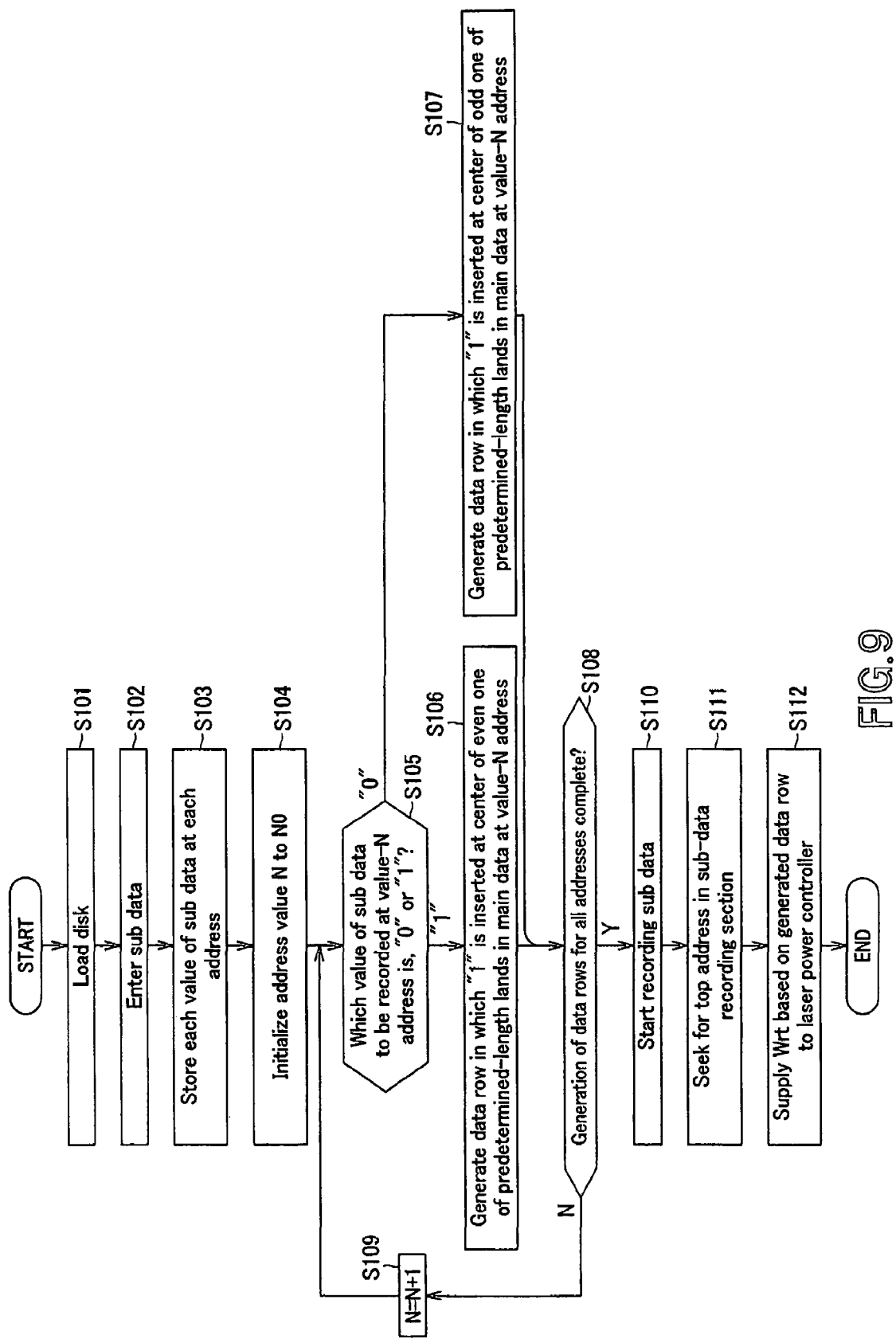
FIG. 9 shows a flow of operations made in the recorder of the first embodiment to record sub data.

As will be understood from the description made above with reference to FIG. 9, the writing timing signal Wrt for recording marks on the disk D16 is generated by the writing timing generation circuit 15 according to the timing of the master clock CLK. Therefore, if the master clock CLK is erroneous as above, the writing timing signal Wrt will also be erroneous, which will make it impossible to record the mark in a correct inserting position.

Also, if the edge pulse is inaccurately detected as above, the binary data generated based on that edge pulse will possibly be erroneous. Because of this erroneous binary data, the address detection circuit 14 cannot possibly detect an address stably.

Figure 10:
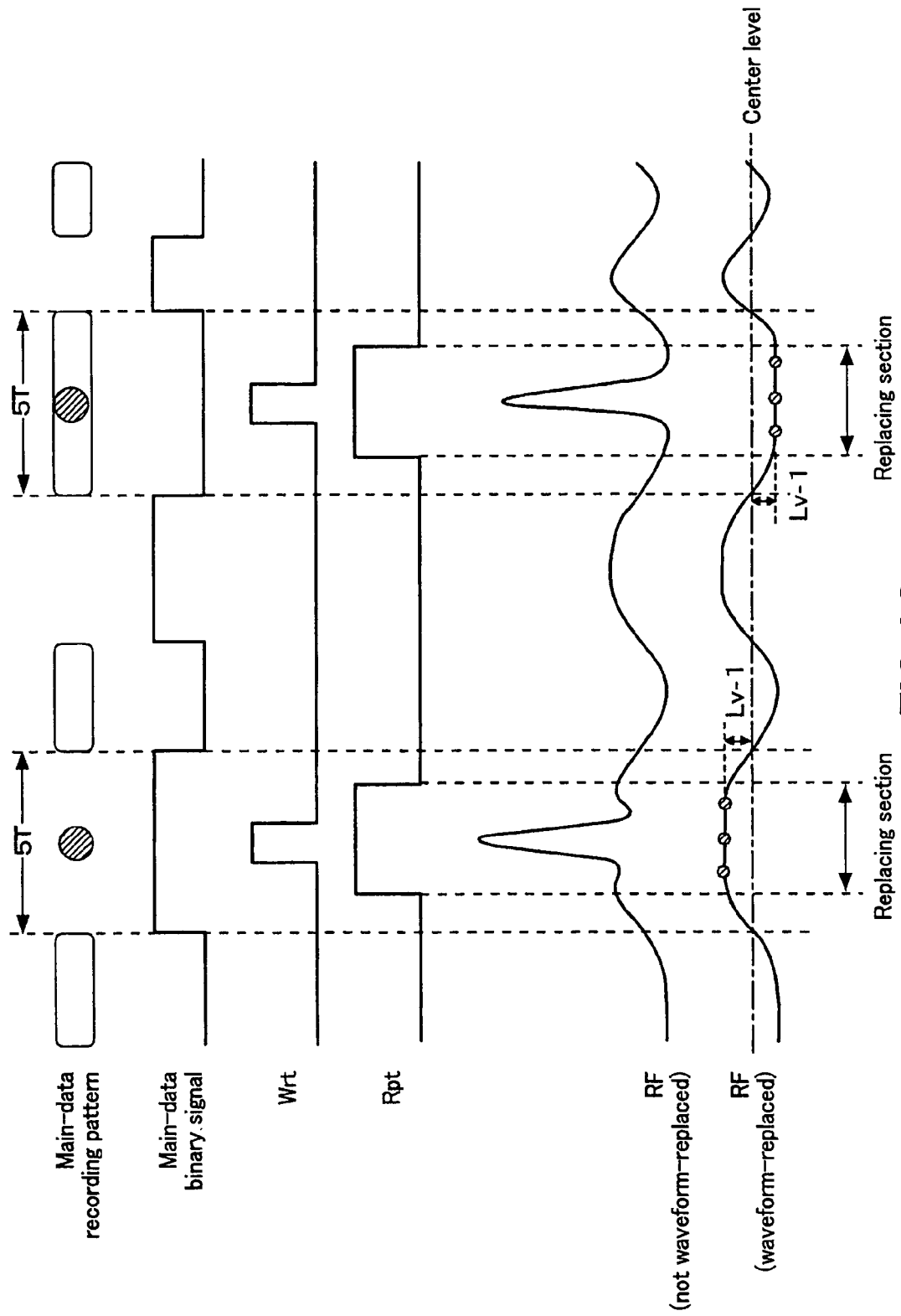
FIG. 10 shows a timing chart showing the timing in which the waveform is to be replaced in the recorder of the first embodiment.

On this account, according to this embodiment, the read signal RF in the mark inserting position is replaced with a waveform prepared in advance as shown in FIG. 10.

As shown in FIG. 10, a pattern of main data is recorded as a main-data recording pattern to the disk D16. FIG. 10 also shows an example in which a mark is to be inserted in a section of 5 T, for example, of the main data. It should be noted that in this example, a mark is recorded on each of a land of 5 T and a pit of 5 T.

FIG. 10 also shows a binary signal provided in the sub data recorder 1 correspondingly to the main-data recording pattern, and a writing timing signal Wrt for recording a mark in the mark inserting position.

Note here that as having been described above, various problems are caused by the superposition of a pulse generated during irradiation of writing-power laser light on the read signal RF correspondingly to the mark-recorded portion as indicated with the illustrated read signal RF (not waveform-replaced). On this account, the waveform of the read signal RF is replaced with a waveform prepared in advance in a section (replacing section) corresponding to such a mark-recorded portion as indicated with the read signal RF (waveform-replaced) as shown, to thereby eliminate the influence of the writing laser irradiation on the read signal RF.

The sub data recorder 1 shown in FIG. 6 includes the replacing timing generation circuit 18 and waveform replacing circuit 19 to enable the above-mentioned operations.

The replacing timing generation circuit 18 is supplied with the master clock CLK from the PLL circuit 12 as having been described with reference to FIG. 2 as well, and also supplied with the address information ADR from the address detection circuit 14.

The replacing timing generation circuit 18 is designed to read data from the RAM 16 in the sub data generator 17 and thus refer to the content of main data recorded at each address in the sub-data recording section on the disk D16.

As will be described in detail later, the replacing timing generation circuit 18 generates a replacing timing signal Rpt indicative of a replacing section as shown in FIG. 10 on the basis of the content of main data in the RAM 16, and supplies it to the waveform replacing circuit 19.

The waveform replacing circuit 19 replaces the waveform of the read signal RF supplied from the matrix circuit 5 with a waveform having a set level in a replacing section designated with the replacing timing signal Rpt, and supplies the waveform-replaced read signal RF to the equalizer 10 and center level detection circuit 9.

Note here that in the first embodiment, the level of a replacement waveform set by the waveform replacing circuit 19 is set to a fixed value corresponding to a level Lv-1 shown in FIG. 10. The level LV-1 is a level, which should normally be, of the read signal RF for a predetermined-length land (or predetermined-length pit) specified as a mark inserting position.

For example, since a land of 5 T is specified as the mark inserting position in this case, so there may be set a level Lv-1 which can be assumed to be a value of the read signal RF for the 5 T land. Alternatively, in case a 5 T pit is specified as the mark inserting position, there may be set a level Lv-1 which can be assumed to be a value of the read signal RF for the 5 T pit.

Also, as seen from FIG. 10, the waveform replacement is effected synchronously with recording of a mark. This timing of replacement is represented by the writing timing signal Wrt.

Therefore, the mark writing timing can be identified for replacing the waveform similarly to the sub-data writing timing. That is, it is identified whether the mark inserting position is an odd or even one of predetermined-length lands, depending upon whether the code of sub data assigned to each sector (address) is "0" or "1". Then, the position of the odd or even predetermined-length land should be identified based on the main data to be stored into the RAM 16.

However, it should be noted that the mark inserting position is equivalent to one bit at the center of a specific land and a predetermined-length section including the central one bit as the mark inserting position is set as a replacing section in this case.

As shown in FIG. 10, the actual resultant read signal RF will not have any waveform having a pulse superposed only at the central portion thereof as the mark inserting position but will be influenced also at bit positions before and after the central portion with the result that the level will be different from a level, which should normally be, of the waveform in a section including the central portion and several bits before and after the central portion.

More specifically, although the central portion of 5 T is taken as the mark inserting position, a section of 3 bits in total including one bit at the central portion and one bit on either side of the central bit is set as the replacing section correspondingly.

The replacing timing generation circuit 18 generates a replacing timing signal Rpt by identifying such an inserting section. That is, the replacing timing generation circuit 18 first detects, based on the content of main data to be stored in the RAM 16, a predetermined-length land which is a mark inserting position as above, and then detects one bit at the central portion and one bit on either side of the central bit.

As in generation of the writing timing signal Wrt, there is generated a data row in which the code "1" stands in only the replacing section thus identified and "0" stands in all other sections. A replacing timing signal Rpt indicative of a correct replacing time can be generated based on this data row.

The replacing timing generation circuit 18 and waveform replacing circuit 19 replace the waveform of read signal as will be described in detail below with reference to the flow diagram shown in FIG. 11.

Figure 11:
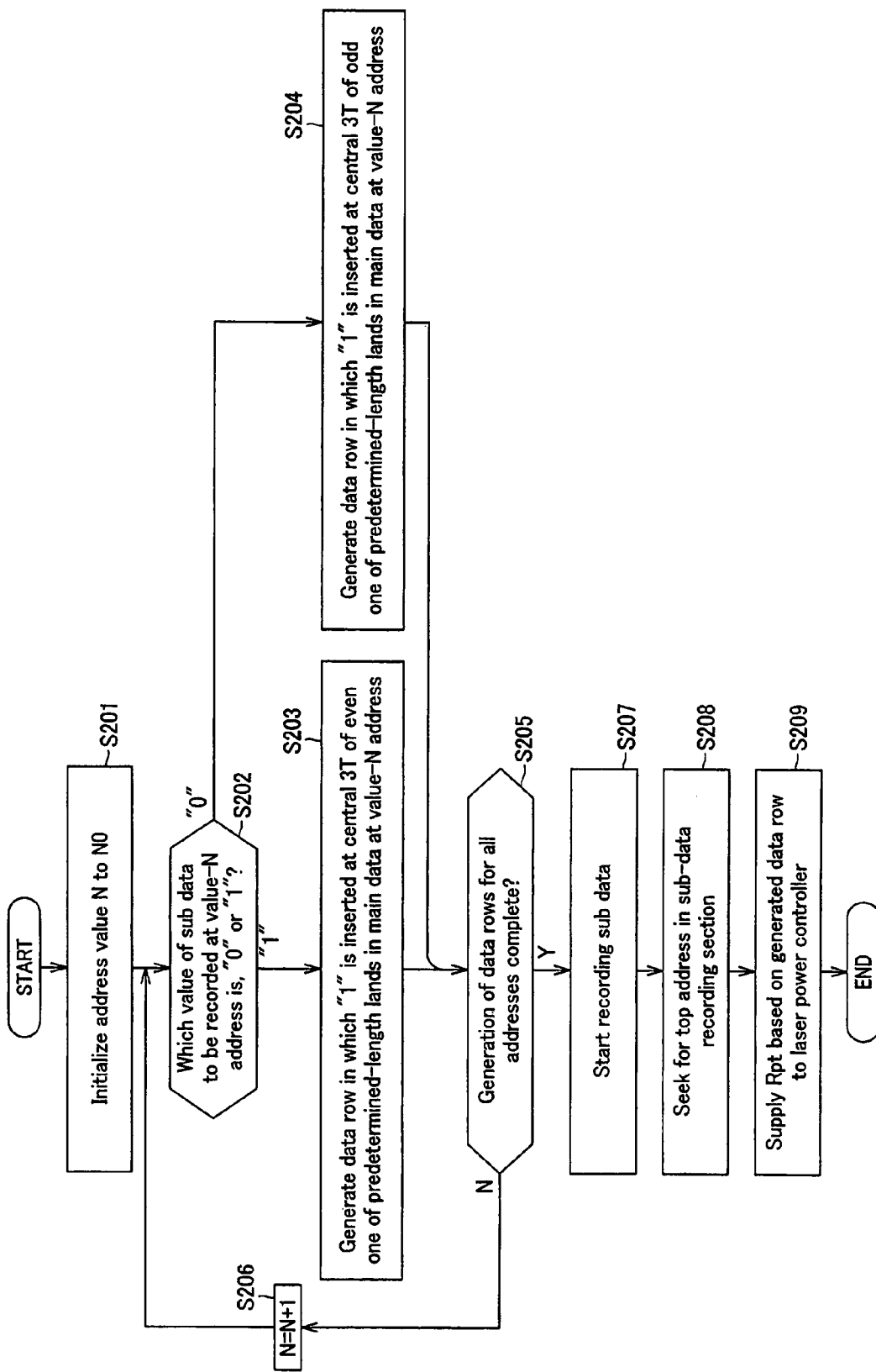
FIG. 11 shows a flow of operations made in the recorder of the first embodiment to replace the waveform.

Note that the operations shown in FIG. 11 should be effected after sub data is stored at each address in the RAM 16 in the step of sub data recording (in step S103) shown in FIG. 9.

That is, as will be seen from the above explanation, for generating the replacing timing signal Rpt, the mark inserting position should first be identified based on the value of each address of the main data and sub data in the RAM 16 as in generation of the writing timing signal Wrt. Namely, the storage of sub data into the RAM 16 should be complete before generation of the replacing timing signal Rpt.

As will be seen from FIG. 11, data row for generating the replacing timing signal Rpt (in steps S201 to S206) is generated generally as in generating data row for generating the writing timing signal Wrt (in steps S104 to S109).

That is, first in step S201, the address value N is initialized to N0.

In step S201, the replacing timing generation circuit 18 initializes the internal counter to the count N0 in order to generate a data row for each of the addresses which will be explained below.

In step S202, the replacing timing generation circuit 18 judges whether the code for the sub data to be recorded at the value-N address is "0" or "1". Namely, in step S202, the replacing timing generation circuit 18 judges whether one, associated with the count in the internal counter, of the codes of sub data stored at corresponding addresses in the RAM 16 is "0" or "1".

In case it is determined in step S202 that the sub data code is "1", the replacing timing generation circuit 18 goes to step S203 in which it will generate a data row in which "1" is inserted in the central 3 T of the even predetermined-length land in the main data at the address having the value N. Thus, as a data row including all channel bits in one sector, there is generated a data row in which only the codes at 3 bits in total including one bit at the center of the even predetermined-length land and one bit on either side of the central bit are "1" while other codes are all "0".

On the contrary, in case the sub data value is "0", the replacing timing generation circuit 18 goes to step S204 in which it will generate a data row in which "1" is inserted at the central 3 T of the odd predetermined-length land in the main data at the value-N address. Thus, as a data row including all channel bits in one sector, there is generated a data row in which the codes at 3 bits in total including one bit at the center of the odd predetermined-length land and one bit on either side of the central bit are "1" while other codes are all "0".

After generating the data row for one sector, the replacing timing generation circuit 18 judges whether the counter initialized to N0 in step S201 has reached a preset predetermined count. That is, it judges in step S205 whether generation of data row for all the addresses (sectors) in a sub-data recording section is complete.

If the result of the judgment in step S205 is negative, namely, if the counter has not yet reached the predetermined count, the replacing timing generation circuit 18 increments the count N by one (in step S206) and returns to step S202. Thus, data rows are generated for all the sectors in the sub-data recording section.

In case it is determined in step S205 that the counter had reached the predetermined count and the data rows have been generated for all the addresses, the replacing timing generation circuit 19 goes to step S207.

In step S207, the sub data starts being recorded. In next step S208, the top address in the sub-data recording section on the disk D16 is sought.

It should be reminded for confirmation that the operations of sub-data recording start to seek for the top address as in steps S207 to S208 are the same as the recording start to seeking as in steps S110 to S111 in FIG. 9.

In response to the seeking for the top address in the sub-data recording section, the replacing timing generation circuit 18 generates a replacing timing signal Rpt based on the data row generated for each sector with the operations in steps S203 and S204, and supplies it to the waveform replacing circuit 19 in step S209. The replacing timing signal Rpt based on the data row is generated according to the timing of the master clock CLK for synchronism with the main data to be read similarly to the writing timing signal Wrt.

Also, the replacing timing signal Rpt starts being supplied to the waveform replacing circuit 19 synchronously with the supply of information at the top address in the sub-data recording section as address information ADR supplied from the address detection circuit 14.

The waveform replacing circuit 19 replaces the waveform, in the replacing section indicated with the replacing timing signal Rpt, of the read signal RF supplied from the matrix circuit 5 with a waveform as a preset fixed value along the level Lv-1.

At this time, the replacing timing generation circuit 18 generates, based on the data row, a replacing timing signal Rpt that takes the H level at a time when a correct replacing section is reached as shown in FIG. 10. Therefore, the waveform replacing circuit 19 can accurately replace a portion, having the writing pulse superposed thereon, of the read signal RF as shown in FIG. 10 with the waveform Lv-1 on the basis of the replacing timing signal Rpt.

Also, since the level Lv-l assumed as the level of the read signal RF at a predetermined-length land (or pit) as a mark inserting position is set as the level of the replacement waveform, so the read signal RF in the replacing section can take a normal level.

In the sub data recorder 1 according this first embodiment, the waveform of the read signal RF in the mark inserting position is replaced as above at the time of recording sub data to prevent a pulse incident to the laser irradiation for mark recording from being superposed on the read signal RF.

Thus, unless a pulse caused at the time of mark recording is superposed on the read signal RF, the binarization circuit 11 can generate the edge pulse at a correct time and thus the master clock CLK can also be generated at a correct.

Also, since it is possible to prevent the writing pulse from being superposed on the read signal RF, the center level detected by the center level detection circuit 9 can be inhibited from rising, so that a correct master clock CLK can be generated. Further, the equalizer 10 can equalize the read signal RF without being influenced by the pulse superposition, so that a correct master clock CLK can be generated.

With generation of such a correct master clock CLK, the writing timing generation circuit 15 can generate the writing timing signal Wrt at a correct time based on the correct master clock CLK, whereby marks as sub data can be recorded in correct inserting positions.

Thus, each value of the sub data can be recorded accurately. Namely, sub data can be recorded stably.

Also, with correct generation of an edge pulse as above, a correct binary data can be generated to assure accurate detection of an address in the address detection circuit 14.

Furthermore, according to the first embodiment, the level Lv-1 assumed to be the level of the read signal RF at a predetermined-length land as a mark inserting position is set as the level of the replacement waveform. Thus, a waveform which should normally be can be provided as the waveform of the read signal RF having the waveform replaced as above.

Note here that for a single purpose of preventing the pulse developed at the time of mark recording from influencing the read signal RF, the read signal RF in a replacing section may be masked. By this method, however, the read signal RF cannot have a normal waveform.

Unless the read signal RF has a normal waveform, the read signal RF having the waveform thereof equalized cannot also have the normal waveform, possibly resulting in generation of an erroneous master clock CLK, detection of incorrect address, etc. However, since there can be provided a read signal RF having a normal waveform, the aforementioned first embodiment of the present invention is free from the above problems.

SECOND EMBODIMENT

Next, the sub data recorder 20 as the second embodiment will be described with reference to FIGS. 12 to 14.

In the sub data recorder 1 as the first embodiment, a fixed value is used as the level of the replacement waveform in the waveform replacing circuit 19. In the sub data recorder 20 as the second embodiment, however, the level of replacement waveform is set based on the level of a read signal RF actually read from the disk D16.

Figure 12:
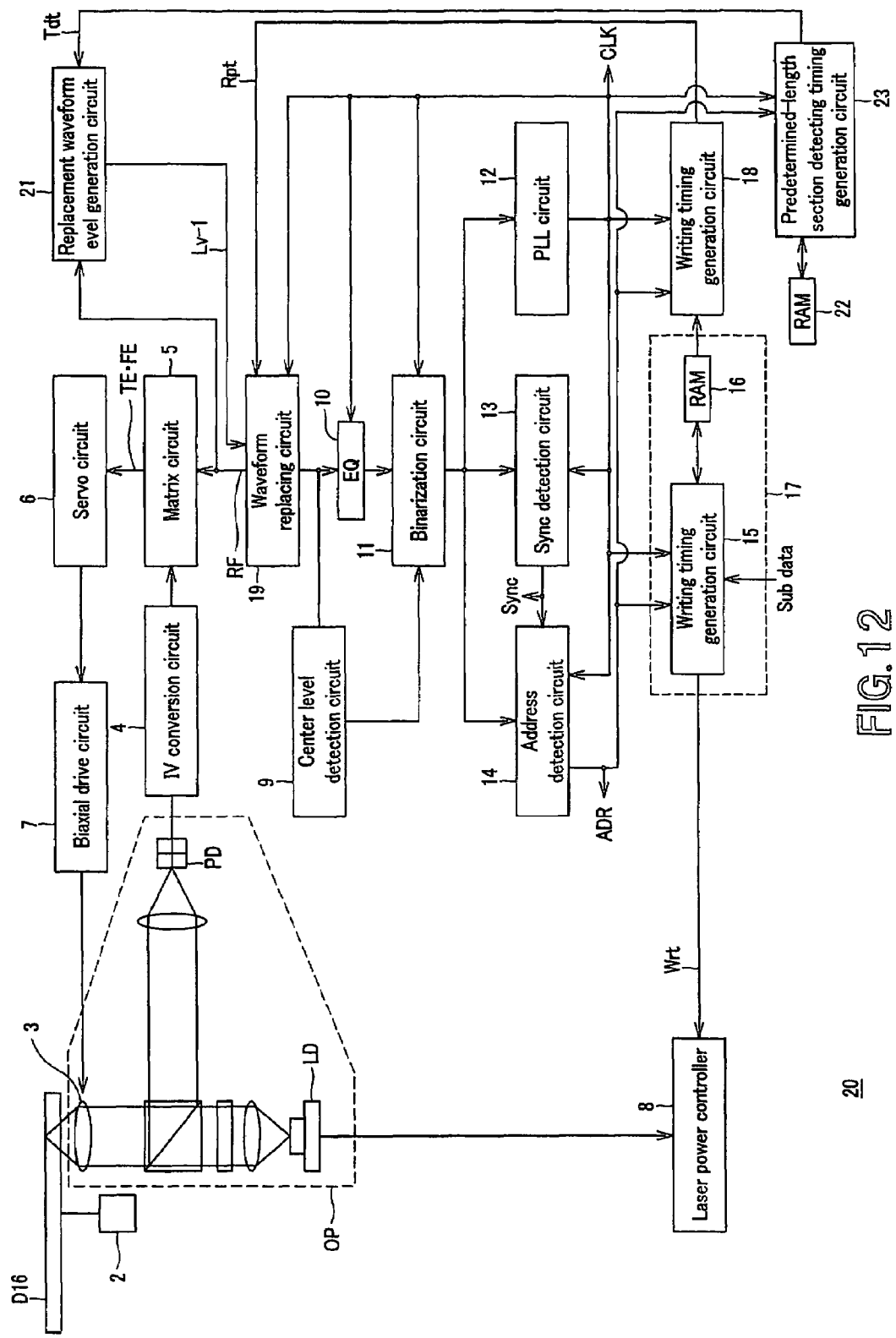
FIG. 12 is a schematic block diagram of a recorder of a second embodiment of the present invention.

FIG. 12 shows the internal construction of the sub data recorder 20.

Namely, the sub data recorders 1 and 20 according to the first and second embodiments, respectively, are similar to each other in respects other than the replacement waveform level setting. It should be noted that the same components of the sub data recorder 20 as those in the sub data recorder 1, which have already been explained above concerning the respects other than the replacement waveform level setting, will be indicated with the same reference numerals as those used in the description of the sub data recorder 1.

As shown in FIG. 12, the sub data recorder 20 as the second embodiment of the present invention includes, in addition to the components of the sub data recorder 1 shown in FIG. 6, a replacement waveform level generation circuit 21, RAM 22 and a predetermined-length section detecting timing generation circuit 23.

The replacement waveform level generation circuit 21 calculates a level Lv-1 as the replacement waveform level to be set by the waveform replacing circuit 19 on the basis of the result of sampling the level of the read signal RF supplied from the matrix circuit 5.

The predetermined-length section detecting timing generation circuit 23 is supplied with the master clock CLK from the PLL circuit 12 and address information ADR from the address detection circuit 14.

The predetermined-length section detecting timing generation circuit 23 generates a predetermined-length section detecting timing signal Tdt indicative of a time at which the level of the read signal RF is to be sampled by the replacement waveform level generation circuit 21.

Also, the RAM 22 shown in FIG. 12 stores information required for use by the predetermined-length section detecting timing generation circuit 23 to generate the predetermined-length section detecting timing signal Tdt.

It is assumed here that the section where waveform of the read signal RF is to be replaced by the waveform replacing circuit 19 is a predetermined-length land as a mark inserting position as will be evident from the above explanation. Therefore, a replacement waveform level, which should normally be, can be determined based on the result of sampling a plurality of levels of the read signal RF at the predetermined-length land.

The sampling should be done before the mark recording because sampling effected after the mark recording in which the waveform replacement is actually done is meaningless.

When main data is read before recording marks, the replacement waveform level generation circuit 21 determines, based on the result of sampling the level at the predetermined-length land, the replacement waveform level for the read signal RF supplied from the matrix circuit 5.

Note that the operation and internal construction of the replacement waveform level generation circuit 21 will be described in detail later.

Also, the predetermined-length section detecting timing generation circuit 23 generates the predetermined-length section detecting timing signal Tdt so that the level of the read signal RF at the predetermined-length land can be sampled by the replacement waveform level generation circuit 21 as above.

At this time, the predetermined-length section detecting timing signal Tdt can be generated by generating a data row from the content of the main data to be recorded to the disk D16 similarly to the writing timing signal Wrt and replacing timing signal Rpt.

More specifically, in this case, there can be generated row data in which a code "1" is inserted in only a section where the level of the read signal RF is to be sampled and "0" is inserted in all other sections to generate a signal indicative of a correct time of sampling as the predetermined-length section detecting timing signal Tdt.

According to an embodiment, the waveform replacing circuit 19 replaces the waveform of the read signal RF in the section of 3 T including the central portion of the predetermined-length land with the replacement waveform as above. Therefore, the waveform level, which should normally be, of the read signal RF as the replacement waveform, can correspondingly be replaced based on the result of sampling the level at the section of 3 T including the central portion of the predetermined-length land.

Thus, a signal that takes the H level only at the section of 3 T including the central portion of the predetermined-length land can be generated as the predetermined-length section detecting timing signal Tdt similarly to the replacing timing signal Rpt.

That is, the predetermined-length section detecting timing generation circuit 23 generates the predetermined-length section detecting timing signal Tdt on the basis of generating the data row in which a code "1" is inserted in only the section of 3 T including the central portion of the predetermined-length d and other codes are all "0".

Note here that for generating the above-mentioned data row intended for generating the timing signal Tdt, the predetermined-length section detecting timing generation circuit 23 must be able to refer to the main data in the section where the replacement waveform level detection circuit 21 is to sample the waveform level of the read signal RF. The main data in the sampling section, required for generating the data row, should have been stored in the RAM 22.

The RAM 22 also stores the content of the main data to be recorded in the above sampling section at each corresponding address in the sampling section.

Thus, the predetermined-length section detecting timing generation circuit 23 can generate a data row on the basis of the content of main data at each address (sector) similarly to the aforementioned writing timing signal Wrt and replacing timing signal Rpt.

As described above, the RAM 22 is provided separately. However, the data row for generating the timing signal Tdt from the information stored in the RAM 16 may be generated by sampling the replacement waveform level in the same section as the sub-data recording section.

That is, by setting a sampling section where the replacement waveform level is to be sampled is set in the sub-data recording section, the RAM 22 may be omitted.

Next, the internal construction of the replacement waveform level generation circuit 21 shown in FIG. 12 will be explained with reference to FIG. 13.

First, the replacement waveform level generation circuit 21 is supplied with the read signal RF from the matrix circuit 5 as shown in FIG. 12. Also, it is supplied with the predetermined-length section detecting timing signal Tdt from the predetermined-length section detecting timing generation circuit 23.

Figure 13:
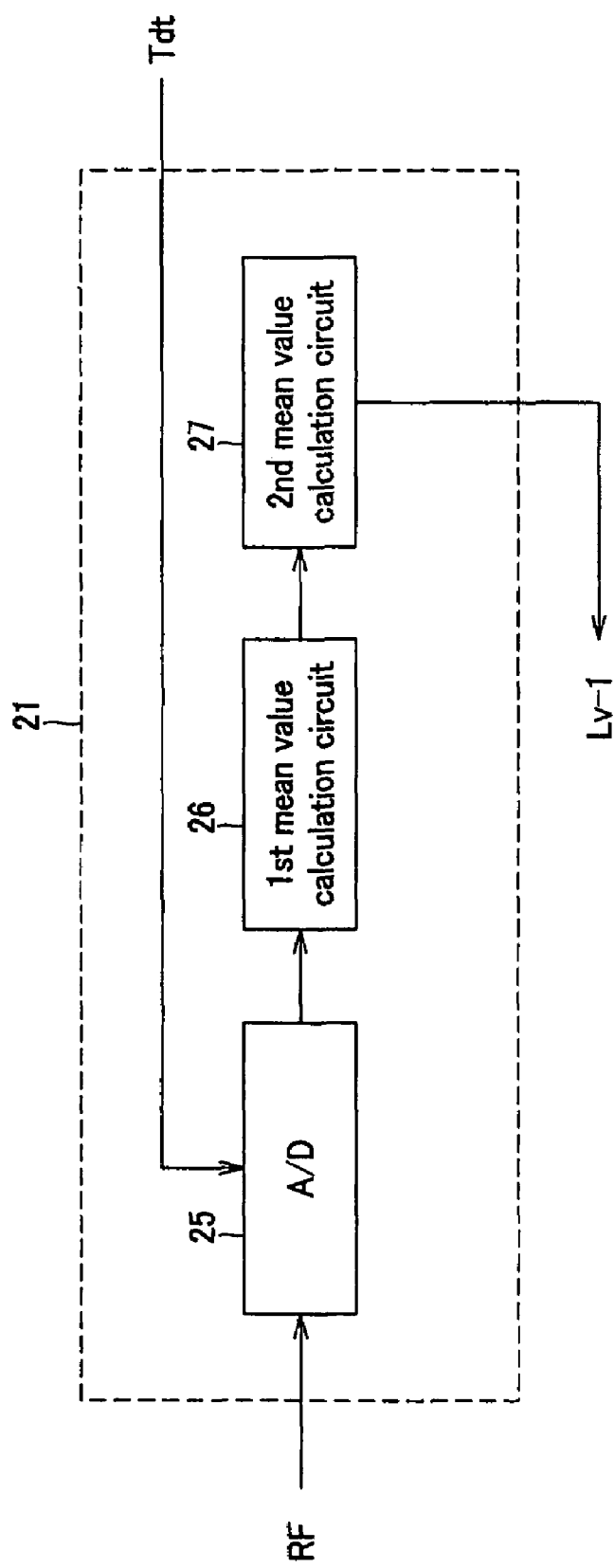
FIG. 13 is also a schematic block diagram of a replacement waveform level generation circuit included in the recorder of the second embodiment.

As shown in FIG. 13, the read signal RF and predetermined-length section detecting timing signal Tdt supplied as above are supplied to an A-D converter 25.

The A-D converter 25 samples the level of the read signal RF on the basis of the predetermined-length section detecting timing signal Tdt, and supplies the sampled level to a first mean value calculation circuit 26.

Note here that the predetermined-length section detecting timing signal Tdt is indicative of timing of sampling the section of 3 T including the central portion of the predetermined-length land.

Since the A-D converter 25 is designed to sample the level of the read signal RF at each channel bit synchronous with the master clock CLK, so it will sample 3 values by sampling the level of the read signal RF in the section of 3 T designed by the above-mentioned predetermined-length section detecting timing signal Tdt. In this case, the first mean value calculating circuit 26 is supplied with the 3 values at the predetermined-length land.

The first mean value calculating circuit 26 calculates the mean value of the 3 values at each predetermined-length land, supplied from the A-D converter 25 as above, and supplies the mean values (first mean value) thus calculated one after another to a second mean value calculation circuit 27.

The second mean value calculation circuit 27 calculates a mean value (second mean value) of the first mean values supplied from the first mean value calculation circuits 26, and supplies it as the illustrated level Lv-1 to the waveform replacing circuit 19.

Note here that the first mean values supplied from the first mean value calculation circuit 26 are equivalent to the mean level of the waveform of the central portion of 3 T at each predetermined-length land.

The second mean value calculation circuit 27 calculates a mean value of the first mean values calculated by the first mean value calculation circuit 26. Namely, the second mean value calculation circuit 27 further averages the first means values of the waveforms at all the predetermined-length lands in a sampling section.

That is, the second mean value is resulted from the further averaging of the mean waveform levels at the central portion of 3 T of the predetermined-length land. Thus, a waveform level, which should normally be, can be obtained as a waveform level of the central portion of 3 T of the predetermined-length land.

The second mean value calculated by the second mean value calculation circuit 27 is supplied as the level Lv-1 to the waveform replacing circuit 19. In this case, the level Lv-1 as the second mean value thus supplied is set as the level of a replacement waveform in the waveform replacing circuit 19. With setting of such a level Lv-1, the waveform replacing circuit 19 can replace the waveform of the read signal RF in the replacing section with the waveform having a normal level.

Figure 14:
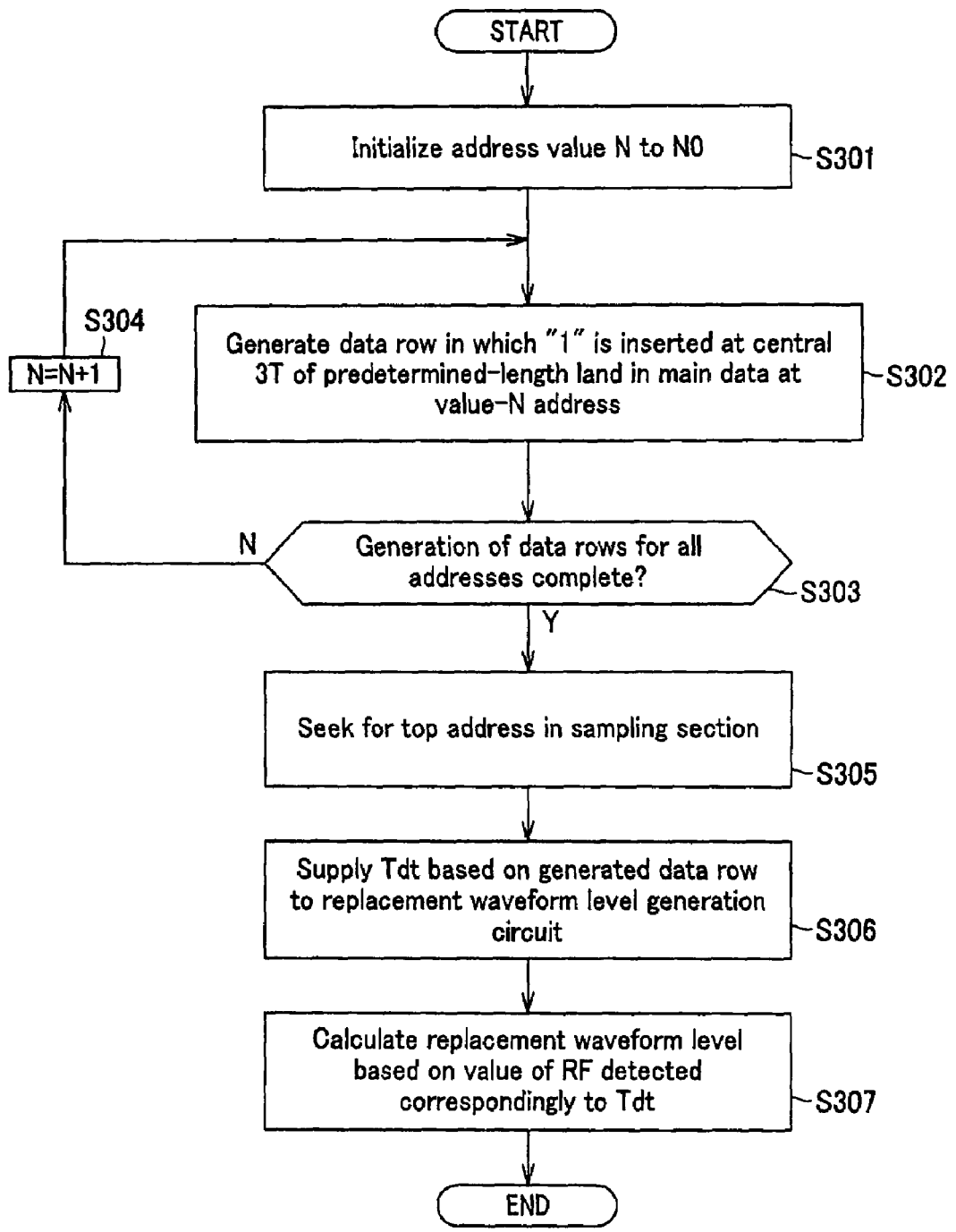
FIG. 14 shows a flow of operations made in the recorder of the second embodiment.

FIG. 14 shows a flow of operations made in the replacement waveform level generation circuit 21, RAM 22 and predetermined-length section detecting timing generation circuit 23 having been explained above with reference to FIGS. 12 and 13.

First, to determine the replacement waveform level on the basis of the actual read signal RF, main data is read from the disk D16 before recording marks as above, and the level of the read signal RF at the predetermined-length land, thus determined, is sampled by the replacement waveform level generation circuit 21.

Then, for the sampling by the replacement waveform level generation circuit 21, a data row intended for generation of the predetermined-length section detecting timing signal Tdt should be pre-generated for specifying a correct time of sampling to the replacement waveform level generation circuit 21.

FIG. 14 shows a flow of operations made from generation of such a data row until actual sampling of the read signal RF to calculate the replacement waveform level.

First in step S301, the predetermined-length section detecting timing generation circuit 23 initializes the internal counter (whose count value is N) to a count N0 in order to generate a data row for each address which will be described in detail later.

In step S302, the predetermined-length section detecting timing generation circuit 23 generates a data row in which "1" is inserted in the section of central 3 T of the odd predetermined-length land for the predetermined-length land in the main data at the address N on the basis of the content of the main data in the sampling section to be stored in the RAM 22.

That is, with the operation made in step S302, there is generated a data row in which only the section of central 3 T of the predetermined-length land is "1" and other codes are all "0" as a data row including all channel bits in one sector as the address N in the sampling section.

After the data row of the one sector is generated, the predetermined-length section detecting timing generation circuit 23 judges in step S303 whether generation of data rows for all addresses is complete. Namely, it judges whether the counter once initialized to N0 in step S301 has reached a preset predetermined value.

If the result of judgment in step S303 is negative, namely, if the counter has not yet reached the predetermined count, the predetermined-length section detecting timing generation circuit 23 increments the address value N by one in step S304, and then returns to step S302. Thus, the data rows are generated for all the sectors in the sampling section.

In case it has been determined in step S303 that the counter has reached the predetermined value, the predetermined-length section detecting timing generation circuit 23 goes to step S305.

In step S305, a controller (not shown) to control the entire sub data recorder 20, for example, controls each appropriate system component on the basis of information at the top address in a predetermined sampling section to seek for the top address in the sampling section on the disk D16.

In response to the seeking for the top address in the sampling section, the predetermined-length section detecting timing generation circuit 23 generates a predetermined-length section detecting timing signal Tdt based on the data row generated for each sector with the operations in step S302, and supplies it to the replacement waveform level generation circuit 21 in step S306. The predetermined-length section detecting timing signal Tdt based on the data row is generated based on the master clock CLK for synchronism with the main data to be read as in generation of the writing timing signal Wrt and replacing timing signal Rpt.

Also, the predetermined-length section detecting timing signal Tdt starts being supplied synchronously with supply of the information at the top address in the sampling section as address information ADR supplied from the address detection circuit 14.

The replacement waveform level generation circuit 21 calculates a replacement waveform level on the basis of the read signal RF detected according to the predetermined-length section detecting timing signal Tdt supplied as above.

That is, in the replacement waveform level generation circuit 21, the A-D converter 25 detects 3 values determined in the section of 3 T including the central portion of the predetermined-length land from the read signal RF at a time designated according to the predetermined-length section detecting timing signal Tdt as shown in FIG. 14.

Then, the first mean value calculation circuit 26 calculates a mean value (first mean value) of the values detected by the A-D converter 25. As above, the first mean value is equivalent to the mean level of the waveform of the central 3 T portion of each predetermined-length land in the sampling section.

Then, the second mean value calculation circuit 27 calculates a means value (second mean value) of the first mean values calculated by the first mean value calculation circuit 26 by determining a mean value of the first mean values of the read signal waveform levels at all the predetermined-length lands, determined in the sampling section as mentioned above. Thus, a waveform level which should normally be can be generated as a waveform level of the central 3 T potion of the predetermined-length land.

The second mean value thus generated in the replacement waveform level generation circuit 21 is supplied as the level Lv-1 to the waveform replacing circuit 19 in which it will be set as a replacement waveform level. Thus, a level, which should normally be, corresponding to an actual read signal RF can be set as the replacement waveform level.

The sub data recorder 20 as the second embodiment can set a replacement waveform level, which should normally be, according to the read signal RF actually obtainable from the disk D16. Thus, a read signal RF having a waveform which should normally be can be provided even in case the read signal RF is varied in level from one disk D16 to another, for example, which is loaded in the sub data recorder 20, and the master clock CLK and address information ADR can further be improved in accuracy.

Note that in the second embodiment, the sampling section varies in content from one title to another of the disk D16. Therefore, in case the tile is different from one disk D16 to another, the information in the RAM 22 should be updated to a content correspondingly to the disk D16.

Also in the second embodiment, the predetermined-length section detecting timing signal Tdt indicative of a time of sampling is pre-generated from the content of main data, and the read signal RF is sampled by the replacement waveform level detection circuit 21 on the basis of the predetermined-length section detecting timing signal Tdt.

However, the replacement waveform level detection circuit 21 may be designed to detect a predetermined-length land from an input read signal RF without being supplied with the predetermined-length section detecting timing signal Tdt. For example, a predetermined-length land can be detected based on an edge pulse from the binarization circuit 11.

In case no predetermined-length section detecting timing signal Tdt may be generated as above, the RAM 22 and predetermined-length section detecting timing generation circuit 23 shown in FIG. 12 may be omitted, so that the number of components of the sub data recorder 20 and hence the manufacturing costs can be reduced correspondingly.

Also, since the replacing section includes the central 3 T portion of the predetermined-length land, the predetermined-length section detecting timing signal Tdt indicates the section of 3 T including the central portion of the predetermined-length land as sampling timing. However, the second embodiment is not limited to the above predetermined-length section detecting timing signal Tdt but the predetermined-length section detecting timing signal Tdt may indicate sampling timing corresponding to a section set as a replacing section.

Further, in the forgoing, there has been described an example in which a replacement waveform level is set by determining a mean value (first mean value) of the read signal RF for each replacing sections, and averaging these mean values to provide a mean value (second mean value). However, the second embodiment is not limited to the above technique, but the replacement waveform level may be set to a value, which should normally be, based on the read signal RF.

Note that the present invention is not limited to the aforementioned first and second embodiments.

In the forgoing, it has been described for the simplicity of explanation that a mark as sub data is inserted at either of the odd and even ones of the adjacent predetermined-length lands (or pits) to represent a code "0" or "1", for example. For making it difficult for any third party to interpret such a recording pattern, however, any other algorithm, such as an M-sequential random number, may be used to determine a mark inserting position, for example.

In this case, a rule for the aforementioned code representation and rule for assignment of a section assigned to one bit of sub data, if defined in common for the sub data recorder 1 or 20 and the player, will permit the player to accurately read the sub data.

Also, in the aforementioned embodiments according to the present invention, the disk D16 (100) is used which is a ROM disk conforming to the Blue-Ray™ disk by way of example. However, the above embodiments are not limited to such a disk D16, but an optical-disk recording medium, which includes a substrate, and at least a reflective layer and cover layer stacked on the substrate, and is capable of recording main data as a combination of pits and lands formed on the substrate, may also be used.

In the aforementioned embodiments, main data is pre-stored in the RAM 16, for example. However, the above embodiments are not limited to this technique, but main data may be read from a section of the loaded disk D16 and stored into the RAM 16.

It should be understood by those skilled in the art that various modifications, combinations, sub-combinations and alterations may occur depending on design requirements and other factors insofar as they are within the scope the appended claims or the equivalents thereof.

The invention is claimed as follows:

1. A recording apparatus to record sub data to an optical-disk recording medium comprising a substrate and at least a reflective layer and a cover layer stacked on the substrate and to which main data is to be recorded as a combination of pits and lands formed on the substrate by irradiating laser light having a writing power to the reflective layer to form marks as the sub data on the reflective layer, the apparatus comprising:
   a read signal generating means for generating a read signal by detecting a return part of laser light having a reading power, irradiated to the optical-disk recording medium;
   a sub-data recording means for recording the sub data by forming the marks in mark inserting positions on the reflective layer of the optical-disk recording medium, in accordance with a predetermined rule and a waveform-replaced read signal, with the laser light being controlled to have the writing power; and
   a waveform replacing means for replacing a waveform of the read signal generated by the read signal generating means, corresponding to a section having a predetermined length and including the mark inserting position, with a replacement waveform having a determined level,
   wherein the waveform replacing means is connected to the read signal generating means and the sub-data recording means.

2. The apparatus according to claim 1, further comprising a storage means for storing the main data to be recorded to the optical-disk recording medium,
   the sub-data recording means being designed to generate a writing timing signal indicative of the mark inserting position on the basis of the content of the main data stored in the storage means and the predetermined rule before recording the marks to the optical-disk recording medium, and control the laser light to have the writing power in timing based on the writing timing signal; and
   the waveform replacing means being designed to identify the mark inserting position on the basis of the content of main data stored in the storage means and the predetermined rule before recording the marks to the optical-disk recording medium to generate a replacing timing signal indicative of the predetermined-length section including the mark inserting position, and replace the waveform of the read signal with the replacement waveform on the basis of the replacing timing signal.

3. The apparatus according to claim 1, wherein:
   the mark inserting position is substantially at the center of a predetermined-length pit or land formed as the main data; and
   the predetermined-length section is a section of a plurality of bits including the bit at the center of the predetermined-length pit or land.

4. The apparatus according to claim 1, wherein the level of the replacement waveform set by the waveform replacing means is fixed.

5. The apparatus according to claim 1, further comprising a waveform level calculating means for calculating the level of the replacement waveform in the waveform replacing means on the basis of the result of detecting the level, at a predetermined-length pit or land defined as the mark inserting position, of a read signal generated by the read signal generating means.

6. A recording method of recording sub data to an optical-disk recording medium comprising a substrate and at least a reflective layer and a cover layer stacked on the substrate and to which main data is to be recorded as a combination of pits and lands formed on the substrate by irradiating laser light having a writing power to the reflective layer to form marks as the sub data on the reflective layer, the method comprising:
- generating a read signal by detecting a return part of laser light having a reading power and which has been irradiated to the optical-disk recording medium;
- recording the sub data by forming the marks in mark inserting positions on the reflective layer of the optical-disk recording medium, determined in accordance with a predetermined rule and a waveform-replaced read signal, with the laser light being controlled to have the writing power; and
- replacing a waveform of the read signal generated by the read signal generating means, corresponding to a section having a predetermined length and including the mark inserting position, with a waveform having a determined level.

7. A disk producing method of producing an optical-disk recording medium comprising a substrate and at least a reflective layer and a cover layer stacked on the substrate and to which main data is to be recorded as a combination of pits and lands formed on the substrate by irradiating laser light having a writing power to the reflective layer to form marks as the sub data on the reflective layer, the method comprising:
- forming a disk master having the main data recorded as the combination of pits and lands thereon;
- producing a disk having only the main data recorded thereon forming the substrate using a stamper formed based on the disk master and stacking at least the reflective layer and cover layer on the substrate; and
- recording the sub-data to the disk having the main data recorded thereon, said sub-data recording step including
  - generating a read signal by detecting a return part of laser light having a reading power and which has been irradiated to the disk having the main data recorded thereon,
  - recording the sub data by forming the marks in mark inserting positions on the reflective layer of the disk having the main data recorded thereon, determined in accordance with a predetermined rule and a waveform-replaced read signal, with the laser light being controlled to have the writing power, and
  - replacing a waveform of the read signal generated in the read signal generating step, corresponding to a section having a predetermined length and including the mark inserting position, with a waveform having a determined level.

8. A recording apparatus to record sub data to an optical-disk recording medium comprising a substrate and at least a reflective layer and a cover layer stacked on the substrate and to which main data is to be recorded as a combination of pits and lands formed on the substrate by irradiating laser light having a writing power to the reflective layer to form marks as the sub data on the reflective layer, the apparatus comprising:
- a read signal generator to generate a read signal by detecting a return part of laser light having a reading power, irradiated to the optical-disk recording medium;
- a sub data recorder to record the sub data by forming the marks in mark inserting positions on the reflective layer of the optical-disk recording medium, determined in accordance with a predetermined rule and a waveform-replaced read signal, with the laser light being controlled to have the writing power; and
- a waveform replacing unit to replace a waveform of the read signal generated by the read signal generator, corresponding to a section having a predetermined length and including the mark inserting position, with a replacement waveform whose level has been set,
- wherein the waveform replacing unit is connected to the read signal generator and the sub data recorder.

* * * * *